(12) United States Patent
Kanda et al.

(10) Patent No.: US 7,995,448 B2
(45) Date of Patent: Aug. 9, 2011

(54) OPTICAL DISC DEVICE

(75) Inventors: Yoshihiro Kanda, Osaka (JP);
Takashige Hiratsuka, Saijo (JP);
Minoru Ochiai, Kyoto (JP)

(73) Assignee: Panasonic Corporation, Osaka (JP)

( * ) Notice: Subject to any disclaimer, the term of this patent is extended or adjusted under 35 U.S.C. 154(b) by 1789 days.

(21) Appl. No.: 10/542,342

(22) PCT Filed: Mar. 26, 2004

(86) PCT No.: PCT/JP2004/004251
§ 371 (c)(1),
(2), (4) Date: Jul. 14, 2005

(87) PCT Pub. No.: WO2004/086385
PCT Pub. Date: Oct. 7, 2004

(65) Prior Publication Data
US 2006/0120252 A1 Jun. 8, 2006

(30) Foreign Application Priority Data

Mar. 26, 2003 (JP) ................................ 2003-086368
Aug. 28, 2003 (JP) ................................ 2003-305210

(51) Int. Cl.
*G11B 7/00* (2006.01)
(52) U.S. Cl. ......... 369/124.01; 369/124.13; 369/124.04; 369/47.17; 369/59.16
(58) Field of Classification Search ........................ None
See application file for complete search history.

(56) References Cited

U.S. PATENT DOCUMENTS

| 5,428,455 A * | 6/1995 | Hosoya et al. ................. 386/114 |
| 5,986,989 A | 11/1999 | Takagi et al. |
| 6,195,320 B1 * | 2/2001 | Furumiya et al. ............ 369/47.2 |
| 7,057,982 B2 * | 6/2006 | Aoe et al. .................... 369/44.34 |
| 2002/0196717 A1 | 12/2002 | Masui et al. |

FOREIGN PATENT DOCUMENTS

| JP | 9-50634 | 2/1997 |
| JP | 9-128769 | 5/1997 |
| JP | 10-116426 | 5/1998 |
| JP | 2002-298375 | 10/2002 |
| JP | 2002-352437 | 12/2002 |

* cited by examiner

*Primary Examiner* — Muhammad N. Edun
(74) *Attorney, Agent, or Firm* — Wenderoth, Lind & Ponack, L.L.P.

(57) ABSTRACT

An optical disc device including a high frequency band processing circuit for removing low frequency components of signals outputted from plural photodetectors of a pickup, and generating various kinds of signals required for recording/playback of an optical disc by digital processing after performing AD conversion by a high-speed low-bit AD converter; and a low frequency band processing circuit for removing high frequency components of the signals outputted from the respective photodetectors of the pickup, and generating various kinds of signals required for recording/playback of an optical disc by digital processing after performing AD conversion by a low-speed high-bit time-division AD converter.

15 Claims, 20 Drawing Sheets

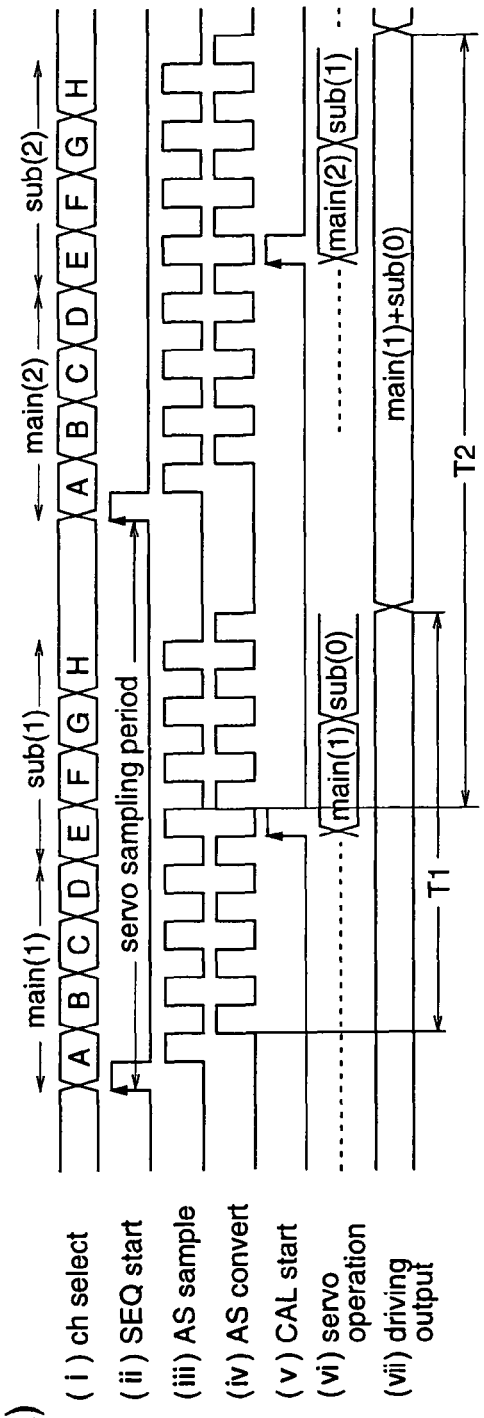
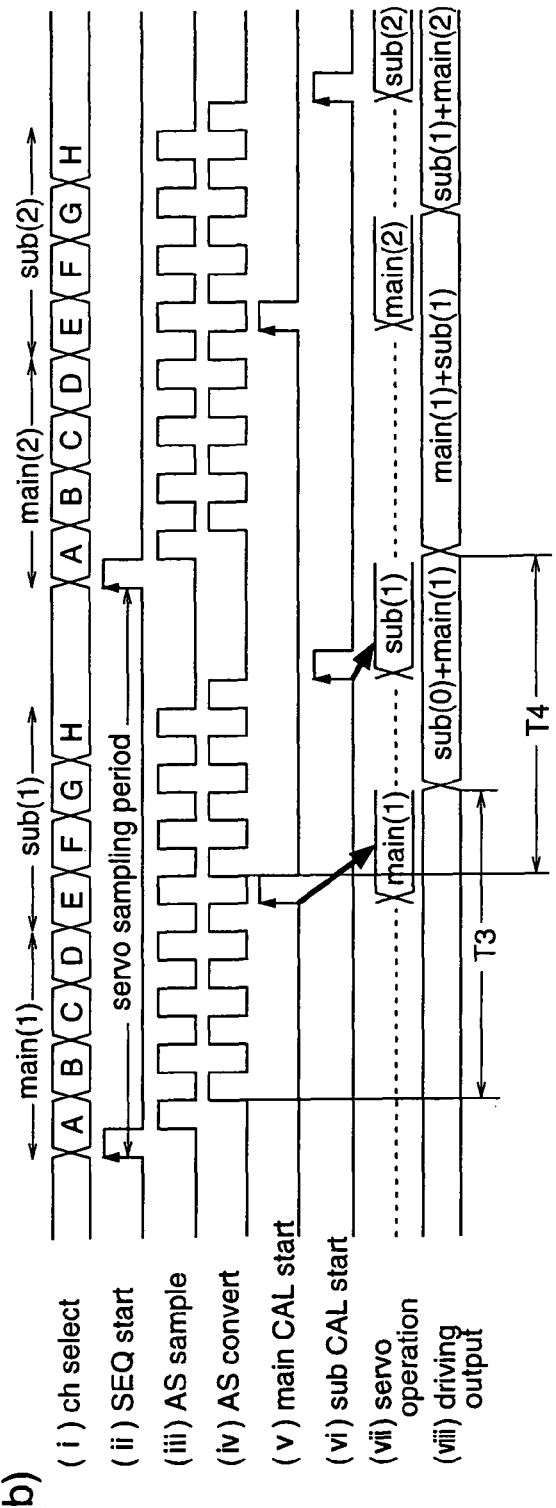
Fig.5(a)
Fig.5(b)

Fig.21

| | TE=(TE+)*(1-a)-(TE-)*(1+a) |
|---|---|
| (a) | TE+ = A , FE- = B |
| (b) | TE+ =(A+D), FE- =(B+C) |
| (c) | TE+ =(A+D)-k(E+H), TE- =(B+C)-k(F+G) |
| (d) | TE+ =(phase difference AB), TE- =(phase difference CD) |

Fig.22

| | FE=(FE+)*(1-a)-(FE-)*(1+a) |
|---|---|
| (a) | FE+ =E, FE- =F |
| (b) | FE+ =H, FE- =G |
| (c) | FE+ =A+C, FE- =B+D |
| (d) | FE+ =(A+C)-k(F+H), FE- =(B+D)-k(E+G) |

Fig.23

| AS=A+B+C+D |
|---|

US 7,995,448 B2

OPTICAL DISC DEVICE

BACKGROUND OF THE INVENTION

1. Technical Field

The present invention relates to an optical disc device for detecting various kinds of signals required for recording and playback of an optical disc, using signals outputted from photodetectors of an optical pickup.

2. Background Art

FIG. 20 is a block diagram illustrating the construction of a conventional optical disc device.

With reference to FIG. 20, the conventional optical disc device comprises a pickup 1000, VGA 1001a~h, HPF 1002a~d, comparators 1003a~d, a phase difference tracking error signal detection circuit 1004, an off track signal generation circuit 1005, a differential RF signal generation circuit 1006, a wobble signal generation circuit 1007, a CAPA detection signal generation circuit 1008, a servo error signal generation circuit 1009, a selector 1010, a selector 1011, an LPF 1012, a comparator 1013, an LPF 1014, an LPF 1015, an LPF 1016, a selector 1017, and an ADC 1018. In order to indicate the specific numbers of the VGA 1001, the HPF 1002, and the comparators 1003, respectively, a pickup having three four-part split photodetectors each comprising four split photodetectors (hereinafter, also referred to as photodetectors) is employed as shown in FIG. 3, and the pickup outputs, as shown in FIG. 3, signals outputted from photodetectors A~D 32 receiving a main beam (hereinafter referred to as main photodetectors A~D), and signals outputted from photodetectors E~H 31 and 33 receiving a sub beam which is applied prior or/and subsequent to the main beam that is applied to the photodetectors A~D (hereinafter referred to as sub photodetectors E~H).

The VGA 1001a~h are gain adjustment amplifiers which receive the signals outputted from the photodetectors A~H of the pickup 1000, and correct fluctuations in the amplitudes of the photodetector output signals due to reflectivity of playback media, fluctuations in laser power, efficiency of pickup, or the like.

The HPF 1002a~d remove DC components and level fluctuation components due to flaws on the disc or the like, from the photodetector output signals.

The comparators 1003a~d binarize RF components of the signals outputted from the HPF 1002a~d, and output them.

The phase difference tracking error signal detection circuit 1004 is constituted by an analog circuit, and measures phase differences among the four-channels of input signals which are outputted from the comparators 1003a~d, thereby to generate a phase difference tracking error signal (hereinafter referred to as a DPDTE signal), and outputs the signal.

The off track signal generation circuit 1005 generates an off track signal for detecting off track, from the DPDTE signal outputted from the phase difference tracking error signal detection circuit 1004.

The differential RF signal generation circuit 1006 generates a differential RF signal (hereinafter referred to as a broadband pushpull TE) from the output signal of the four-part split photodetector.

The wobble signal generation circuit 1007 inputs the broadband pushpull TE outputted from the differential RF signal generation circuit 1006 into a BPF constituted by an analog circuit, and extracts a wobble signal that exists when the disc type is DVD-R/RW or DVD-RAM.

The CAPA detection signal generation circuit 1008 detects that the broadband pushpull TE in a CAPA (address mark) portion oscillates up and down during RAM playback, and outputs a CAPA detection signal.

The servo error signal generation circuit 1009 is constituted by an analog circuit, and performs plural patterns of servo matrix operations and balance operations which have been determined in advance according to the construction of the pickup, the recording/playback media, and the recording/playback mode, on the basis of the outputs from the photodetectors of the optical pickup, thereby generating various kinds of servo error signals. The generated servo error signals include a focus error signal (hereinafter referred to as an FE signal), a tracking error signal (hereinafter referred to as a TE signal), and a full addition signal expressing the amount of reflected light (hereinafter referred to as an AS signal).

FIGS. 21, 22, and 23 show examples of matrix operation expressions which are carried out to generate TE signals, FE signals, and AS signals by the servo error signal generation circuit 1009. In these figures, A~H denote the output signals from the respective photodetectors shown in FIG. 3. Further, a phase difference AB denotes a phase difference between the output signals from the photodetectors A and B, a phase difference CD denotes a phase difference between the output signals from the photodetectors C and D, and k and a denote operation constants, respectively.

In the servo error signal generation circuit 1009, the matrix operations are carried out while switching the operation expressions as shown in FIGS. 21, 22, and 23 according to the pickup structure, the playback media, the playback mode and the like, thereby generating TE signals, FE signals, and AS signals. When performing operations of plural expressions as shown in FIGS. 21, 22, and 23, it is necessary to constitute the servo error signal generation circuit 1009 by an analog circuit which can perform matrix operations according to the respective expressions and an operation of total sum thereof.

Further, the selector 1010 selects a TE signal corresponding to the pickup structure, the playback media, and the playback mode from among the plural TE signals generated by the servo error signal generation circuit 1009 and the TE signal detected by the phase difference tracking error signal detection circuit 1004. The selector 1011 selects an FE signal corresponding to the pickup structure, the playback media, and the playback mode from among the plural FE signals generated by the servo error signal generation circuit 1009.

Thereafter, the LPF 1012 removes noise from the TE signal outputted from the selector 1010, and the comparator 1013 binarizes the TE signal using an average of TE signals outputted from the selector 1010 as a threshold value, thereby to output a track cross signal.

The LPF 1014, LPF 1015, and LPF 1016 are anti-aliasing filters each having a cutoff frequency equal to or lower than ½ of a low-band sampling frequency.

The selector 1017 successively selects the TE signal, the FE signal, and the AS signal, and inputs the signals in the ADC 1018. The selector 1017 and the ADC 1018 for converting the signals outputted from the selector 1017 successively into digital signals are components of a time division AD converter.

The digitized TE signal, FE signal, and AS signal outputted from the ADC 1018 are thereafter input to a servo operation circuit (not shown), wherein digital servo operation is carried out according to these servo error signals, thereby generating a drive signal for a drive system.

Next, the operation of the conventional optical disc device constituted as described above will be described.

The signals outputted from the photodetectors A~H of the pickup 1000 are input to the VGA 1001a~h, respectively, wherein gain adjustment is carried out. Then, the outputs from the VGA 1001a~d corresponding to the output signals from the main photodetectors A~D are output to the HPF 1002a~d and to the differential RF signal generation circuit 1006, and the outputs from the VGA 1001a~h are output to the servo error signal generation circuit 1009.

The outputs from the VGA 1001a~d corresponding to the output signals from the main photodetectors A~D are input to the phase difference tracking error signal detection circuit 1004 through the HPF 1002a~d and the comparators 1003a~d, whereby a DPDTE signal is generated, and thereafter, an off track signal is generated by the off track signal generation circuit 1005.

Further, the outputs from the VGA 1001a~d corresponding to the output signals from the main photodetector A~D are input to the differential RF signal generation circuit 1006, wherein a broadband pushpull TE is generated. Thereafter, during DVD-R/RW or DVD-RAM playback, a wobble signal is generated and outputted by the wobble signal generation circuit 1007. During RAM playback, a CAPA detection signal is generated and outputted by the CAPA detection signal generation circuit 1008.

On the other hand, in the servo error signal generation circuit 1009, the inputted signals from the VGA 1001a~h are subjected to predetermined matrix operations using plural analog circuits for performing predetermined plural patterns of operations corresponding to the pickup structure, the playback media, and the playback mode, thereby generating TE signals, FE signals, and AS signals.

The plural TE signals and FE signals generated by the servo error signal generation circuit 1009 are input to the selector 1010 and the selector 1011, and a TE signal and an FE signal which correspond to the pickup structure, the playback media, and the playback mode, are selected from among the inputted TE signals and FE signals, respectively. The DPDTE signal generated by the phase difference tracking error signal detection circuit 1004 is also input to the selector 1010.

Then, the TE signal selected by the selector 1010 is output as a track cross signal through the LPF 1012 and the comparator 1013.

Further, the TE signal and the FE signal which are selected by the selector 1010 and the selector 1011, respectively, and the AS signal outputted from the servo error signal generation circuit 1009 are transferred through the LPF 1014, the LPF 1015, the LPF 1016, and the selector 1017, and are successively converted into digital signals by the ADC 1018.

The conventional optical disc device is able to detect signals corresponding to recording and playback of all DVD/CD system optical discs including DVD-RAM/R/RW and CD-R/RW, whereby all the DVD/CD system discs can be played using the single optical disc device.

In the above-mentioned conventional optical disc device, however, the input signal frequency band to the tracking error signal generation circuit 1009 ranges from DC to low frequency (several tens of KHz), while the input signal frequency band to the differential RF signal generation circuit 1006 and the HPF 1002 is a high frequency band ranging from several KHz to several tens of MHz. Therefore, the VGA 1001a~d should cover both of the frequency bands, and are required of a wide-range gain and offset adjustment function, resulting in an increase in the product costs.

Further, the differential RF signal generation circuit and the wobble signal generation circuit are required to generate a wobble signal and a CAPA detection signal, respectively. In the conventional optical disc device, however, since the differential RF signal generation circuit and the wobble signal generation circuit are constituted by analog circuits, the circuit scale is increased, leading to an obstacle to downsizing of the optical disc device.

Further, since the signal outputted from the analog BPF that is used for generating a wobble signal has significant variations in the band width and the output characteristic of the center frequency, the passband width of the BPF should previously be designed to be wider than the required passband width.

Further, since, in the conventional optical disc device, the servo error signal generation circuit 1009 is constituted by analog circuits as described above, it is necessary to provide plural kinds of analog signals for performing the predetermined plural patterns of operations corresponding to the pickup structure, the playback media, and the playback mode, leading to increases in circuit scale and power consumption.

Since the servo error signal generation circuit 1009 is constituted by analog circuits, when performing the operations shown in FIGS. 21 and 22 using the servo error signal generation circuit 1009, there may occur limitations on adjustment precision of the values k and a which are operation constants, due to limitations on the circuit scale and the like, and further, the adjusted operation constants may be varied, leading to deterioration of S/N.

Furthermore, when performing the operations TE=(TE+)*(1−a)−(T−)*(1+a) and FE=(FE+)*(1−a)−(FE−)*(1+a) shown in FIGS. 21 and 22 using hardware, an analog multiplier is required, and the analog multiplier and other operation circuits cause an offset, which makes it difficult to generate an accurate servo error signal.

Further, when operating the tracking servo using the TE signal, in order to improve S/N, it is desirable that the cutoff frequency of the LPF 1005 is set to a minimum value (usually 50~80 KHz) within the bounds of not adversely affecting the servo characteristics. During seeking, however, the track cross cycle becomes 100 KHz or more, and therefore, it is necessary to change the cutoff frequency of the LPF 1012 according to the seek velocity, leading to complicated circuit construction and increased circuit scale.

Further, in order to realize digitization of signal processing, AD converters that receive the outputs of the VGA 1001a~d of the conventional optical disc device may be provided to digitally perform the subsequent signal processing. However, data having a precision of 4 bits or more at a sampling frequency of several tens of MHz is required for each input data as input data to the differential RF signal generation circuit 1006 and to the HPF 1002, while data having a precision of 8 bits or more at a sampling frequency of several hundreds of KHz is required for each input data as input data to the servo error signal generation circuit 1009. Therefore, the AD converters to be connected to the VGA 100a~d must have a precision of 8 bits or more and a conversion velocity of several tens of MHz, leading to an increase in product costs.

The present invention is made to solve the above-described problems and has for its object to provide an optical disc device for performing recording or playback of plural kinds of optical discs, which can reduce product costs, circuit scale, and power consumption, and detect various kinds of signals of high reliability which are not influenced by variations in temperature characteristics or ICs.

SUMMARY OF THE INVENTION

According to the present invention, there is provided an optical disc device comprising: a high frequency band processing circuit for removing low frequency components of signals outputted from photodetectors of an optical pickup, and subjecting the signals to AD conversion with a high-speed low-bit AD converter, and thereafter, generating various kinds of signals required for recording/playback of an optical disc by digital processing; and a low frequency band processing circuit for removing high frequency components of the signals outputted from the photodetectors of the optical pickup, and subjecting the signals to AD conversion with a low-speed high-bit AD converter, and thereafter, generating various kinds of signals required for recording/playback of the optical disc by digital processing.

According to the optical disc device constructed as described above, since the high-speed low-bit-number AD converter can be used as an AD converter for high frequency band signal processing while the low-speed high-bit-number AD converter can be used as an AD converter for low frequency band signal processing, a low-cost digitization system can be realized without using high-performance AD converters. Further, since the high frequency band and the low frequency band are processed separately, it becomes unnecessary to provide a high-performance VGA that covers the frequencies of both of the high frequency band and the low frequency band, thereby achieving a reduction in product cost.

According to the present invention, in the optical disc device, the high frequency band processing circuit includes plural stages of HPFs having different cutoff frequencies which are in ascending order with respect to the signals outputted from the photodetectors of the pickup, and performs detection of plural signals required for recording/playback of the optical disc using signals of desired frequency bands which are outputted from the respective HPFs.

According to the optical disc device constructed as described above, the signals of desired frequency bands which are required for detecting the plural kinds of signals can be obtained from the outputs of the respective HPFs, whereby the various signals required for recording/playback of the optical disc can be detected using a single circuit.

According to the present invention, in the optical disc device, the high frequency band processing circuit comprises: first HPFs for removing DC components of the output signals from the respective photodetectors of the pickup and level fluctuations in low frequencies, said first HPFs being provided correspondingly to the output signals from the respective photodetectors; second HPFs for receiving the output signals from the first HPFs, and removing frequencies which are higher than the cutoff frequency of the first HPFs and equal to and lower than a predetermined cutoff frequency; AD converters for receiving the output signals from the second HPFs, and AD-converting the output signals from the second HPFs; and third HPFs for receiving the digital signals outputted from the AD converters, and removing frequencies which are higher than the cutoff frequency of the second HPFs and equal to and lower than a predetermined cutoff frequency.

According to the optical disc device constructed as described above, since the AD converters and the like can be shared when detecting plural kinds of signals, the circuit scale can be reduced. Further, since the various signals can be generated by digital processing, it is possible to obtain an optical disc device having stable performance from which adverse effects on detection characteristics caused by variations in the circuit elements are eliminated.

According to the present invention, in the optical disc device, in the high frequency band processing circuit comprises: second HPFs for removing frequencies which are equal to and lower than a predetermined cutoff frequency of the output signals from the respective photodetectors of the pickup, said second HPFs being provided correspondingly to the output signals from the respective photodetectors; AD converters for receiving the output signals from the second HPFs, and AD-converting the output signals from the second HPFs; and third HPFs for receiving the digital signals outputted from the AD converters, and removing frequencies which are higher than the cutoff frequency of the second HPFs and equal to and lower than a predetermined cutoff frequency.

According to the optical disc device constructed as described above, since the AD converters and the like can be shared when detecting plural kinds of signals, the circuit scale can be reduced. Further, since the various signals can be generated by digital processing, it is possible to obtain an optical disc device having stable performance from which adverse effects on detection characteristics caused by variations in the circuit elements are eliminated.

According to the present invention, an optical disc device including a plurality of HPFs having different cutoff frequencies which are in ascending order with respect to signals outputted from photodetectors of a pickup, and performing detection of plural signals which are required for recording/playback of an optical disc, using signals of desired frequency bands, which are outputted from the respective HPFs.

According to the optical disc device constructed as described above, the signals of desired frequency bands which are required for detecting the plural kinds of signals can be obtained from the outputs of the respective HPFs, whereby the various signals required for recording/playback of the optical disc can be detected using a single circuit.

According to the present invention, there is provided an optical disc device comprising: first HPFs for removing DC components of output signals from photodetectors of a pickup and level fluctuations in low frequencies, said first HPFs being provided correspondingly to the output signals from the respective photodetectors; second HPFs for receiving the output signals from the first HPFs, and removing frequencies which are higher than the cutoff frequency of the first HPFs and equal to and lower than a predetermined cutoff frequency; AD converters for receiving the output signals from the second HPFs, and AD-converting the output signals from the second HPFs; and third HPFs for receiving the digital signals outputted from the AD converters, and removing frequencies which are higher than the cutoff frequency of the second HPFs and equal to and lower than a predetermined cutoff frequency.

According to the optical disc device constructed as described above, since the AD converters and the like can be shared when detecting plural kinds of signals, the circuit scale can be reduced. Further, since the various signals can be generated by digital processing, it is possible to obtain an optical disc device having stable performance from which adverse effects on detection characteristics caused by variations in the circuit elements are eliminated.

According to the present invention, there is provided an optical disc device comprising: second HPFs for removing frequencies which are equal to and lower than a predetermined cutoff frequency of output signals from photodetectors of a pickup, said second HPFs being provided correspondingly to the output signals from the respective photodetectors; AD converters for receiving the output signals from the second HPFs, and AD-converting the output signals from the second HPFs; and third HPFs for receiving the digital signals outputted from the AD converters, and removing frequencies which are higher than the cutoff frequency of the second HPFs and equal to and lower than a predetermined cutoff frequency.

According to the optical disc device constructed as described above, since the AD converters and the like can be shared when detecting plural kinds of signals, the circuit scale can be reduced. Further, since the various signals can be generated by digital processing, it is possible to obtain an optical disc device having stable performance from which adverse effects on detection characteristics caused by variations in the circuit elements are eliminated.

According to the present invention, in the optical disc device, the cutoff frequency of the first HPFs is a frequency that does not adversely affect jitter of the signals outputted from the respective photodetectors of the pickup.

According to the optical disc device constructed as described above, the signals outputted from the first HPFs can be used as an added RF signal, and generation of a playback signal for data reproduction and generation of a signal for generating a servo signal can be carried out with a single circuit, resulting in a reduction in circuit scale.

According to the present invention, the optical disc device further comprises a wobble signal generation circuit for generating a wobble signal using the digital signals outputted from the AD converters.

According to the optical disc device constructed as described above, since a wobble signal is generated by digital processing, the circuit scale can be significantly reduced as compared with the case where a wobble signal is generated using digital signals outputted from the AD converters, and further, it is possible to perform generation of an accurate wobble signal from which adverse effects on detection characteristics caused by variations in the circuit elements are eliminated.

According to the present invention, in the optical disc device, the wobble signal generation circuit comprises: a logic operation circuit for performing an arithmetic operation using the digital signals outputted from the AD converters to calculate a pushpull tracking error signal; and a digital BPF for generating a wobble signal from the pushpull tracking error signal calculated by the logic operation circuit.

According to the optical disc device constructed as described above, since a wobble signal is generated using a digital BPF, the circuit scale can be significantly reduced as compared with the case where a BPF is constituted by an analog circuit. Further, since the digital BPF has no variations in BPF characteristics, the BPF can be designed with a sufficient band width, resulting in improved S/N of a reproduced wobble signal.

According to the present invention, in the optical disc device, the cutoff frequency of the second HPFs is a frequency equal to or lower than a passband frequency of the digital BPF.

According to the optical disc device constructed as described above, it is possible to obtain signals of frequency bands that are suited for detecting signals such as a wobble signal, from the outputs of the second HPFs.

According to the present invention, the optical disc device further comprises a pushpull track cross signal generation circuit for generating a pushpull track cross signal using the digital signals outputted from the AD converters; wherein said pushpull track cross signal generated by the pushpull track cross signal generation circuit is used as a track cross signal during high-speed seeking of an optical disc.

According to the optical disc device constructed as described above, during high-speed seeking, playback of the optical disc can be carried out using a high-speed track cross signal that is generated by the pushpull track cross signal generation circuit of the high frequency processing circuit, thereby resolving the problem that the quality of the track cross signal generated by the low-speed track cross signal generation circuit of the low frequency band processing circuit is degraded particularly when the track cross frequency is high.

According to the present invention, in the optical disc device, the pushpull track cross signal generation circuit comprises: a logic operation circuit for performing an arithmetic operation using the digital signals outputted from the AD converters to calculate a pushpull tracking error signal; and a binarization circuit for binarizing the pushpull tracking error signal calculated by the logic operation circuit at a zerocross point to generate a pushpull track cross signal.

According to the optical disc device constructed as described above, during high-speed seeking, playback of the optical disc can be carried out using a high-speed track cross signal that is generated by the pushpull track cross signal generation circuit of the high frequency processing circuit, thereby resolving the problem that the quality of the track cross signal generated by the low-speed track cross signal generation circuit of the low frequency band processing circuit is degraded particularly when the track cross frequency is high.

According to the present invention, in the optical disc device, the cutoff frequency of the third HPFs is a frequency that enables removal of voltage level fluctuations, and removal of wobble components.

According to the optical disc device constructed as described above, it is possible to remove voltage level fluctuations of the outputs from the photodetectors, which fluctuations occur due to a dropout of the optical disc or the like, thereby obtaining signals of high frequency bands which are suited for generating a DPDTE signal and an off track signal.

According to the present invention, the optical disc device further comprises a phase difference tracking error signal detection circuit for generating a phase difference tracking error signal by digital processing using the digital signals outputted from the third HPFs.

According to the optical disc device constructed as described above, since a phase difference tracking error signal is generated by digital processing, the circuit scale can be significantly reduced as compared with the case where a phase difference tracking error signal is generated by an analog circuit, and further, it is possible to perform generation of an accurate phase difference tracking error signal from which adverse effects on detection characteristics caused by variations in circuit elements are eliminated.

According to the present invention, in the optical disc device, the low frequency band processing circuit comprises: LPFs having a cutoff frequency equal to or lower than ½ of a sampling frequency, said LPFs being provided correspondingly to signals outputted from photodetectors of a pickup; a time-division AD converter for performing AD conversion of plural channels while successively selecting the output signals from the first LPFs; a servo error signal generation circuit for performing a servo error signal generation operation by digital processing using the output from the time-division AD converter to generate a servo error signal; and a servo operation circuit for performing a digital servo operation on the basis of the servo error signal generated by the servo error signal generation circuit to generate a driving signal for a driving system.

According to the optical disc device constructed as described above, after AD-converting the output signals from the respective photodetectors, digital processings using micro codes can be carried out by the servo error signal generation circuit, and arithmetic processings corresponding to the pickup structure, the playback media, the playback mode and the like can be carried out by only changing the micro codes.

Further, since the arithmetic processings by the servo error signal generation circuit are digitally carried out, the arithmetic constants used for generating TE signals, FE signals, and AS signals can be minutely adjusted, and further, analog variations such as an offset which are likely to occur during processings using analog circuits can be avoided, thereby generating more accurate servo error signals. Further, in the low frequency band processing circuit, since the plural outputs from the photodetectors of the optical pickup are AD-converted using the time-division AD converter, it becomes unnecessary to provide plural AD converters for the respective photodetectors of the optical pickup, resulting in a reduction in circuit scale.

According to the present invention, there is provided an optical disc device comprising: a time-division AD converter for performing AD conversion of plural channels while successively selecting signals outputted from photodetectors of a pickup; a servo error signal generation circuit for performing a servo error signal generation operation by digital processing using the output from the time-division AD converter to generate a servo error signal; and a servo operation circuit for performing a digital servo operation on the basis of the servo error signal generated by the servo error signal generation circuit to generate a driving signal for a driving system.

According to the optical disc device constructed as described above, after AD-converting the output signals from the respective photodetectors, digital processings using micro codes can be carried out by the servo error signal generation circuit, and arithmetic processings corresponding to the pickup structure, the playback media, the playback mode and the like can be carried out by only changing the micro codes. Further, since the arithmetic processings by the servo error signal generation circuit are digitally carried out, the arithmetic constants used for generating TE signals, FE signals, and AS signals can be minutely adjusted, and further, analog variations such as an offset which are likely to occur during processings using analog circuits can be avoided, thereby generating more accurate servo error signals. Further, in the low frequency band processing circuit, since the plural outputs from the photodetectors of the optical pickup are AD-converted using the time-division AD converter, it becomes unnecessary to provide plural AD converters for the respective photodetectors of the optical pickup, resulting in a reduction in circuit scale.

According to the present invention, there is provided an optical disc device comprising: LPFs having a cutoff frequency equal to or lower than ½ of a sampling frequency, said LPFs being provided correspondingly to signals outputted from photodetectors of a pickup; a time-division AD converter for performing AD conversion of plural channels while successively selecting the output signals from the first LPFs; a servo error signal generation circuit for performing a servo error signal generation operation by digital processing using the output from the time-division AD converter to generate a servo error signal; and a servo operation circuit for performing a digital servo operation on the basis of the servo error signal generated by the servo error signal generation circuit to generate a driving signal for a driving system.

According to the optical disc device constructed as described above, after AD-converting the output signals from the respective photodetectors, digital processings using micro codes can be carried out by the servo error signal generation circuit, and arithmetic processings corresponding to the pickup structure, the playback media, the playback mode and the like can be carried out by only changing the micro codes. Further, since the arithmetic processings by the servo error signal generation circuit are digitally carried out, the arithmetic constants used for generating TE signals, FE signals, and AS signals can be minutely adjusted, and further, analog variations such as an offset which are likely to occur during processings using analog circuits can be avoided, thereby generating more accurate servo error signals. Further, in the low frequency band processing circuit, since the plural outputs from the photodetectors of the optical pickup are AD-converted using the time-division AD converter, it becomes unnecessary to provide plural AD converters for the respective photodetectors of the optical pickup, resulting in a reduction in circuit scale.

According to the present invention, in the optical disc device, when said servo error signal generation circuit performs the servo error signal generation operation using the signals from the photodetectors of the optical pickup receiving a main beam and signals from the photodetectors of the optical pickup receiving a sub beam, the servo error signal generation circuit controls the operation timing of arithmetic processing for the signals from the photodetectors receiving the main beam, which are outputted from the time-division AD converter, and the operation timing of arithmetic processing for the signals from the photodetectors receiving the sub beam, which are outputted from the time-division AD converter, separately from each other, and the servo operation circuit performs the digital servo operation using the signals generated by the servo error signal generation circuit to generate a driving signal for a driving system.

According to the optical disc device constructed as described above, it is possible to minimize both of the arithmetic delay time of the signals outputted from the photodetectors receiving the main beam and the arithmetic delay time of the signals outputted from the photodetectors receiving the sub beam.

According to the present invention, in the optical disc device, when the servo error signal generation circuit performs the servo error signal generation operation using the signals from the photodetectors of the optical pickup receiving a main beam and signals from the photodetectors of the optical pickup receiving a sub beam, the servo error signal generation circuit further includes a high-pass phase-lead filter for correcting, by phase compensation, a delay time up to the start of the arithmetic processing for the signals from the photodetectors receiving the sub beam, with respect to the start time of the arithmetic processing for the signals from the photodetectors receiving the main beam.

According to the optical disc device constructed as described above, an increase in the phase delay due to the arithmetic delay time of the signals outputted from the photodetectors receiving the sub beam can be compensated by a simple construction, thereby preventing degradation in servo characteristics.

According to the present invention, in the optical disc device, the servo error signal generation circuit has a servo error signal generation program for generating plural kinds of servo error signals, and includes an operation unit for performing a servo error signal generation operation using the servo error signal generation program to generate servo error signals, and the operation unit generates plural servo error signals by time-division.

According to the optical disc device constructed as described above, the circuit scale can be significantly reduced as compared with the servo error signal generation operation using conventional analog circuits, and further, it is possible to perform generation of an accurate servo error signal from which adverse effects on detection characteristics caused by variations in the circuit elements are eliminated.

According to the present invention, in the optical disc device, the servo error signal generation circuit has plural servo error signal generation programs for performing servo error signal generation operations which are adapted to the structure of the optical pickup, recording/playback media, and recording/playback mode, and includes an operation unit for performing the servo error signal generation operations using the servo error signal generation programs to generate servo error signals, and the operation unit performs the servo error signal generation operations while selecting the servo error signal generation programs according to the structure of the optical pickup, recording/playback media, and recording/playback mode.

According to the optical disc device constructed as described above, since the branching process to be performed during the operation for generating servo error signals is dispensed with, generation of servo error signals can be carried out using a low-speed operation unit.

According to the present invention, in the optical disc device, there are plural servo error signal generation programs for each kind of servo error signal, and the operation unit performs, for each kind of servo error signal, the servo error signal generation operations while selecting the servo error signal generation programs according to the structure of the optical pickup, recording/playback media, and recording/playback mode.

According to the optical disc device constructed as described above, the branching process to be performed during the operation of generating servo error signals can be dispensed with, and generation of servo error signals corresponding to more extensive optical pickup structure, recording/playback media, and recording/playback mode can be carried out.

According to the present invention, in the optical disc device, wherein the operation unit changes, for each kind of servo error signal, the frequency of use of each servo error signal generation program for generating a desired servo error signal.

According to the optical disc device constructed as described above, the processing load on the operation unit is reduced to realize processing by a low-speed operation unit.

According to the present invention, in the optical disc device, when generating, as servo error signals, full-addition signals (hereinafter referred to as AS signals), focus error signals (hereinafter referred to as FE signals), and tracking error signals (hereinafter referred to as TE signals), said operation unit uses the servo error signal generation programs so that the generation frequency of the AS signals becomes lower than the generation frequencies of the FE signals and TE signals.

According to the optical disc device constructed as described above, the sampling frequency of the low-band AS signal is reduced, whereby the processing load on the operation unit is reduced to realize arithmetic processing using a low-speed operation unit.

According to the present invention, the optical disc device, further includes a timing control circuit for controlling the operation timings of the time-division AD converter and the servo error signal generation circuit; wherein the timing control circuit makes the timing at which acquisition of signals from all the photodetectors required for generating one servo error signal by the servo error signal generation circuit is completed, coincide with the timing at which AD conversion of the signals from all the photodetectors by the time-division AD converter is ended.

According to the optical disc device constructed as described above, it is possible to minimize the phase delay during generation of the servo error signal in the case where the servo error signal generation operation is time-divisionally carried out.

According to the present invention, the optical disc device further includes a timing control circuit for controlling the operation timings of the time-division AD converter and the servo error signal generation circuit; wherein when the servo error signal generation circuit performs the servo error signal generation operation using the signals from the photodetectors of the optical pickup receiving the main beam and the signal from the photodetectors receiving the sub beam, the timing control circuit makes the timing at which acquisition of signals from all the photodetectors receiving the main beam, which are required for generating one servo error signal by the servo error signal generation circuit, is completed, coincide with the timing at which AD conversion of the signals from all the photodetectors receiving the main beam by the time-division AD converter is ended, and the servo error signal generation circuit performs the servo error signal generation operation using the signals from the photodetectors receiving the main beam, which are AD-converted by the time-division AD converter, and the signals from the photodetectors receiving the sub beam, which are AD-converted one-sampling-period previously to the AD-converted signals from the photodetectors receiving the main beam.

According to the optical disc device constructed as described above, since the phase delay of the signals corresponding to the main beam is reduced, adverse effects caused by the phase delay in the finally generated servo error signal can be reduced.

According to the present invention, the optical disc device defined further includes a timing control circuit for controlling the operation timings of the time-division AD converter and the servo error signal generation circuit; wherein, when the servo error signal generation circuit repeats the operation of generating plural kinds of servo error signals using the AD conversion result of the same channel, the servo error signal generation circuit performs, with higher priority, the operation of generating a servo error signal that is more likely to be affected by phase delay and, during the servo error signal generation operation that is initially carried out by the servo error signal generation circuit, said timing control circuit makes the timing at which acquisition of signals from all the photodetectors required for generating the corresponding servo error signal is completed, coincide with the timing at which AD conversion of the signals from all the photodetectors by the time-division AD converter is ended.

According to the optical disc device constructed as described above, since the servo error signal that is more likely to be affected by the phase delay is given higher priority among the plural servo error signals to be generated, adverse effects caused by the phase delay of the servo error signals can be reduced as an optical disc device.

According to the present invention, the optical disc device further includes a timing control circuit for controlling the operation timings of the time-division AD converter and the servo error signal generation circuit, wherein, when the servo error signal generation circuit performs the operation of generating plural kinds of servo error signals using the AD conversion result of the same channel which is output from the time-division AD converter, the timing control circuit makes the time-division AD converter perform AD conversion of the same channel repeatedly within one sampling period and, during the operation of generating plural kinds of servo error signals by the servo error signal generation circuit, said timing control circuit makes the timing at which acquisition of signals from all the photodetectors required for generating each servo error signal is completed, coincide with the timing at which AD conversion of the signals from all the photodetectors by the time-division AD converter is ended.

According to the optical disc device constructed as described above, even when generating plural kinds of servo error signals using the AD conversion result of the same channel, the phase delays of the servo error signals can be reduced.

According to the present invention, the optical disc device further includes a timing control circuit for controlling the operation timings of the time-division AD converter and the servo error signal generation circuit, wherein the time-division AD converter has a mechanism for arbitrarily controlling selection of a channel to be subjected to AD conversion, and channel switching timing; the AD conversion timing of each channel by the time-division AD converter is controlled according to the operation time of the servo error signal generation operation by the servo error signal generation circuit; and the timing control circuit makes the timing at which acquisition of signals from all the photodetectors required for generating one servo error signal by the servo error signal generation circuit is completed, coincide with the timing at which AD conversion of the signals from all the photodetectors by the time-division AD converter is ended.

According to the optical disc device constructed as described above, even when the processing ability of the operation unit is low, phase delays during servo error signal generation can be reduced.

According to the present invention, in the optical disc device, the time-division AD converter comprises: a selector control circuit for controlling selection of a channel to be subjected to AD conversion, and channel switching timing, by outputting control signals to an input selector and an output selector; a selector for receiving the plural output signals from the photodetectors of the optical pickup, and selecting and outputting a signal of a predetermined channel at a predetermined timing that is indicated by the selector control circuit; an AD converter for AD-converting the signal outputted from the input selector to output the digitized signal; and an output selector for outputting the digitized signal outputted from the AD converter, through the channel that is indicated by the selector control circuit and selected by the input selector.

According to the optical disc device constructed as described above, the AD conversion timing and the AD conversion channel of the time-division AD converter can be arbitrarily changed.

BRIEF DESCRIPTION OF THE DRAWINGS

FIG. 5(a) is a timing chart illustrating an operation in the case where the arithmetic processing according to the second embodiment is not carried out.

FIG. 5(b) is a timing chart illustrating an operation in the case where the arithmetic processing according to the second embodiment is carried out.

FIG. 21 is a diagram illustrating examples of arithmetic formulae for generating TE signals.

FIG. 22 is a diagram illustrating examples of arithmetic formulae for generating FE signals.

FIG. 23 is a diagram illustrating an example of arithmetic formula for generating AS signals.

DETAILED DESCRIPTION OF THE INVENTION

Hereinafter, embodiments of the present invention will be described with reference to the drawings.

Embodiment 1

An optical disc device according to a first embodiment of the present invention branches signals outputted from a pickup into two sequences, and processes one sequence of signals using a high frequency band processing circuit having HPFs while processing the other sequence of signals using a low frequency band processing circuit having LPFs.

Figure 1:
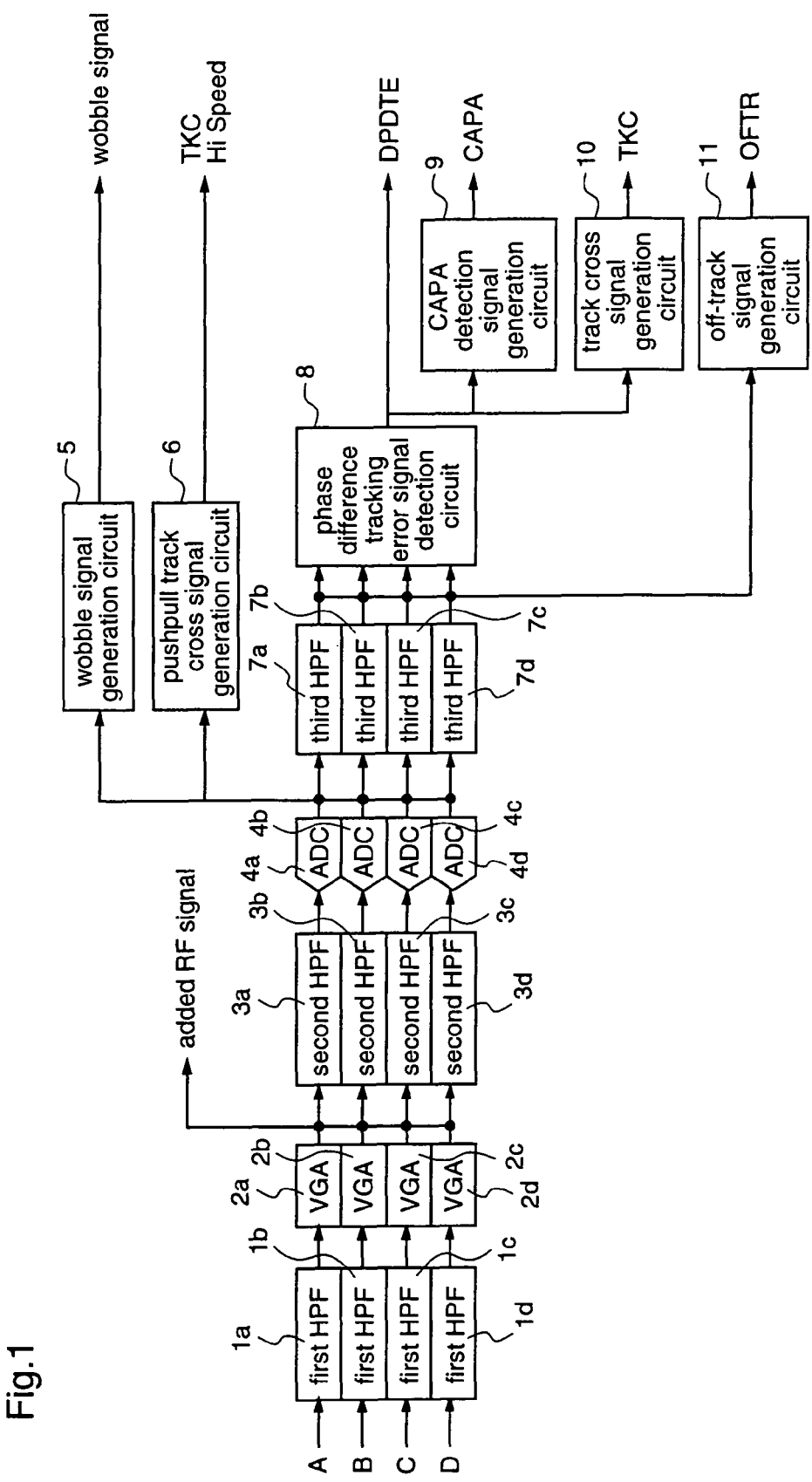
FIG. 1 is a block diagram illustrating an example of construction of a high frequency band processing circuit of an optical disc device according to a first embodiment of the present invention.
Figure 2:
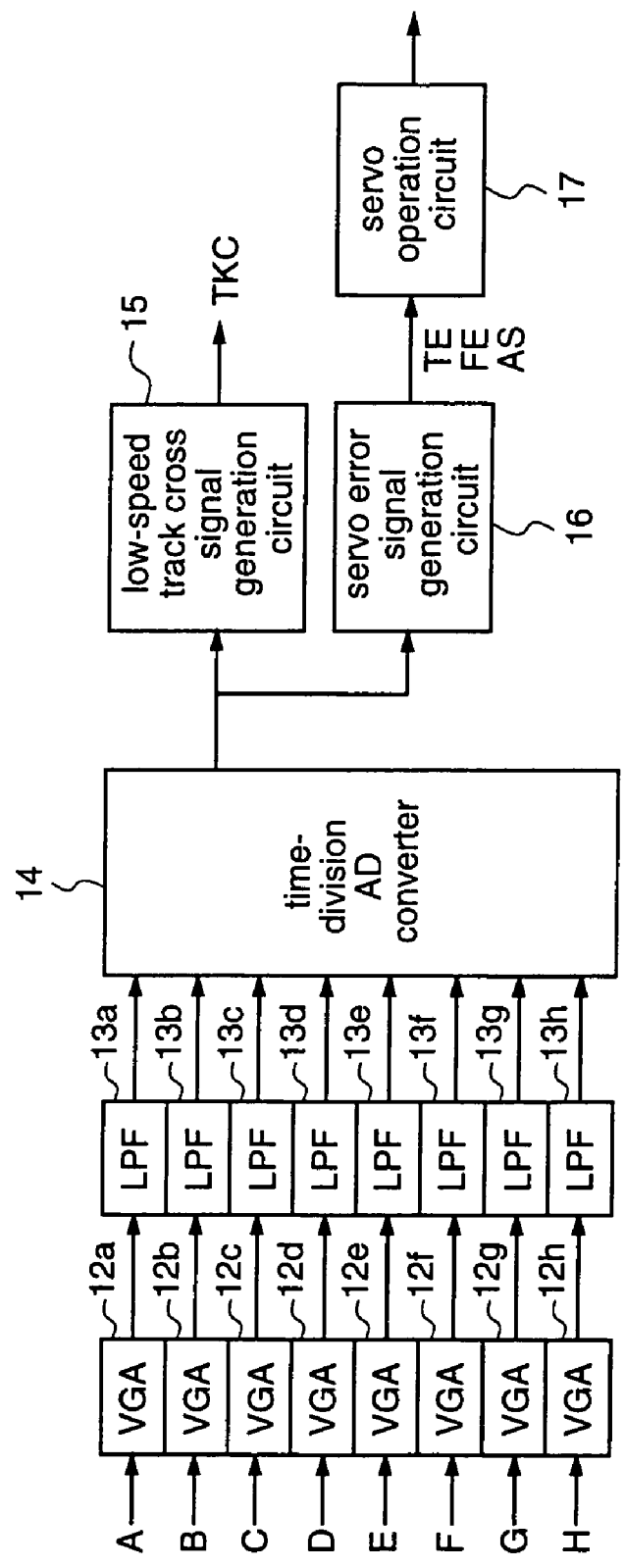
FIG. 2 is a block diagram illustrating an example of construction of a low frequency band processing circuit of the optical disc device according to the first embodiment of the present invention.

FIG. 1 is a block diagram illustrating an example of a high frequency band processing circuit of the optical disc device according to the first embodiment of the present invention, and FIG. 2 is a block diagram illustrating an example of a low frequency band processing circuit of the optical disc device according to the first embodiment.

The high frequency band processing circuit shown in FIG. 1 performs detection of various signals which are required for recording and playback of an optical disc, using high frequency bands of the signals outputted from the pickup, and the low frequency band processing circuit shown in FIG. 2 performs detection of various signals which are required for recording and playback of an optical disc, using low frequency bands of the signals outputted from the pickup.

Figure 3:
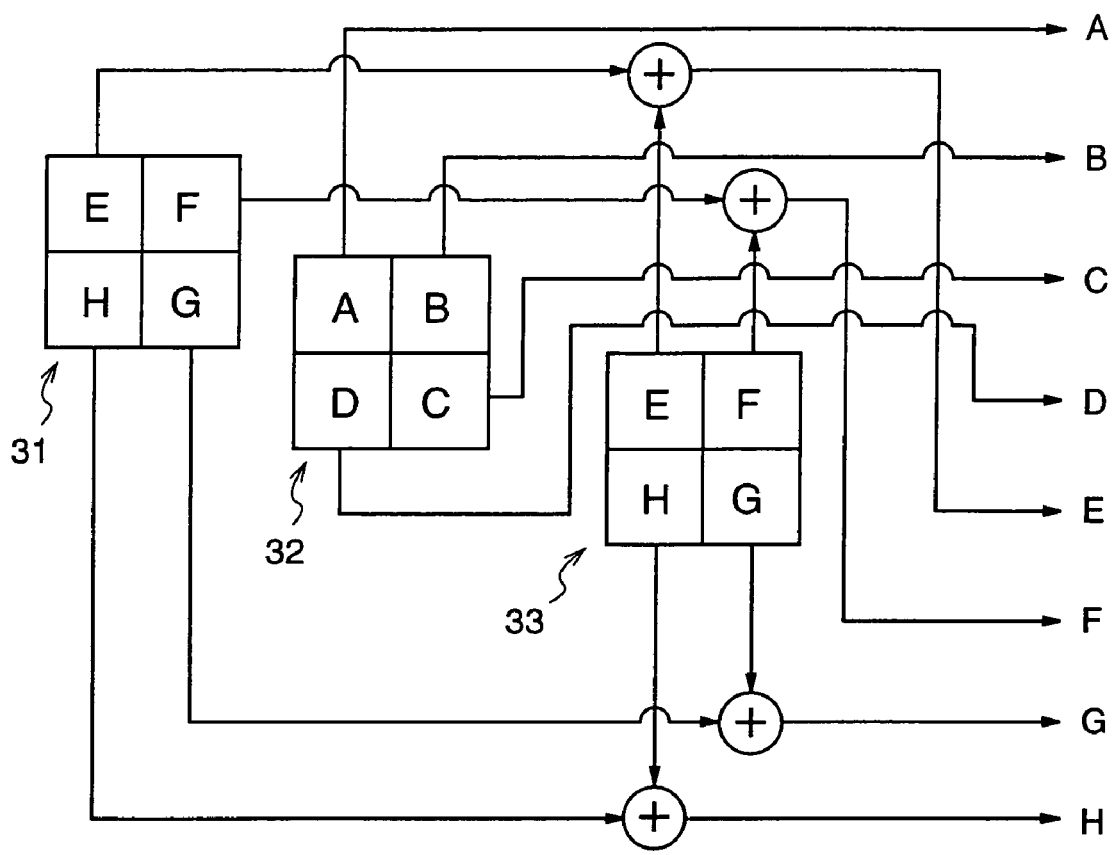
FIG. 3 is a diagram illustrating examples of photodetectors possessed by a pickup according to the first embodiment of the present invention.

In order to indicate the specific numbers of first HPF 1, VGA 2, second HPF 3, and ADC 4a~d of the high frequency band processing circuit and the specific numbers of VGA 12 and LPF 13 of the low frequency band processing circuit, it is assumed that the pickup has three four-part split photodetectors each comprising four split photodetectors (hereinafter referred to as photodetectors) as shown in FIG. 3.

To be specific, as shown in FIG. 3, the pickup generates signals from photodetectors A~D for receiving a main beam (hereinafter, referred to as main photodetectors A~D), and signals from photodetectors E~H 31 and 33 receiving a sub beam which is applied prior or/and subsequent to the main beam that is applied to the photodetectors A~D (hereinafter referred to as sub photodetectors E~H).

Thereafter, the signals generated in the pickup are branched into two sequences, and signals A~D from the photodetectors receiving the main beam are output to the high frequency band processing circuit while the signals A~D from the photodetectors receiving the main beam and signals E~H from the photodetectors receiving the sub beam are output to the low frequency band processing circuit.

Hereinafter, the high frequency band processing circuit will be described in more detail with reference to FIG. 1.

In FIG. 1, the high frequency band processing circuit comprises first HPF 1a~d, VGA 2a~d, second HPF 3a~d, ADC 4a~d, a wobble signal generation circuit 5, a pushpull track cross signal generation circuit 6, third HPF 7a~d, a phase difference tracking error signal detection circuit 8, a CAPA detection signal generation circuit 9, a track cross signal generation circuit 10, and an off track signal generation circuit 11. Although, in this first embodiment of the invention, the first HPF 1a~d, the VGA 2a~d, the second HPF 3a~d, the ADC 4a~d, and the third HPF 7a~d are provided each by four, the number of these circuits is predetermined depending on the number of signals from the photodetectors to be input to the high frequency band processing circuit, and therefore, it is not restricted to four.

The first HPF 1a~d receive the signals from the photodetectors A~D, respectively, and remove DC components such as amplifier offsets and stray light offsets and level fluctuations of low frequency. The cutoff frequency of the first HPF 1a~d is set so that the jitter of the RF signal is not degraded (usually, 100~2 KHz) to make the outputs from the first HPF 1a~d available as an added RF signal as described later. When the outputs of the first HPF 1a~d are not used as added RF, the cutoff frequency of the first HPF 1a~d may be set to the same frequency as the cutoff frequency of the second HPF 3a~d, or the first HPF 1a~d may be dispensed with.

The VGA 2a~d are gain adjustment amplifiers for correcting fluctuations in the amplitudes of the photodetector output signals due to reflectivity of playback media, fluctuations in laser power, efficiency of pickup, or the like. By setting the cutoff frequency of the first HPF 1a~d so that the jitter of the RF signal is not degraded, the outputs from the VGA 2a~d can be output as an addition RF signal to a data playback circuit as shown in FIG. 2. Thereby, generation of a playback signal for data reproduction and generation of a signal for generating a servo signal can be carried out by a single circuit, thereby achieving a reduction in circuit scale.

The second HPF 3a~d have a cutoff frequency equal to or higher than the cutoff frequency of the first HPF 1a~d, and remove offsets caused by the VGA 2a~d and level fluctuations of the playback signal caused by flaws on the disc or the like. The cutoff frequency of the second HPF 3a~d is set at a frequency (usually, equal to or lower than 140 KHz) which passes the frequency signals equal to and higher than the ordinary frequency band of a BPF as a component of the wobble signal generation circuit 5 described later so as to enable wobble detection in the wobble signal generation circuit 5 described later.

The ADC 4a~d are high-speed and low-bit AD converters each having a sampling frequency of about 16~100 MHz and a bit resolution of 5~8 bits, and each ADC performs AD conversion at a sampling frequency that is 0.5~3.0 times as high as the bit rate of the RF signal. It is assumed that the sampling frequency is about 50 MHz, and the bit resolution is abut 5 bits. Further, the ADC 4a~d operate simultaneously.

The wobble signal generation circuit 5 comprises a logic operation circuit and a digital BPF (not shown). The wobble signal generation circuit 5 receives the four channels of high-speed AD converted data outputted from the ADC 4a~d, performs a pushpull operation ((output of ACD 4a)+(output of ADC 4d)−(output of ADC 4b)+(output of ADC 4c)) by the logic operation circuit to generate a broad-band pushpull TE (pushpull tracking error signal), and inputs the generated broad-band pushpull TE to the digital BPF, thereby generating a wobble signal that exists when the disc is a DVD-R/RW or DVD-RAM. The center frequency of the BPF is set at about 140 KHz when the playback speed is a standard speed.

Further, the pushpull track cross signal generation circuit 6 comprises a logic operation circuit and a binarization circuit (not shown). The pushpull track cross signal generation circuit 6 receives the four channels of high-speed AD converted data outputted from the ADC 4a~d, performs a pushpull operation ((output of ACD 4a)+(output of ADC 4d)−(output of ADC 4b)+(output of ADC 4c)) by the logic operation circuit to generate a high-speed pushpull TE (pushpull tracking error signal), and performs binarization at the average of the high-speed pushpull TE or the zerocross point by the binarization circuit, thereby generating a pushpull track cross signal.

The third HPF 7a~d are digital HPF having a cutoff frequency higher than the cutoff frequency of the second HPF 3a~d, and remove voltage level fluctuations caused by flaws on the disc, and wobble components, for DPDTE signal detection. It is assumed that the cutoff frequency of the third HPF 7 is set at 100~300 KHz.

The phase difference tracking error signal detection circuit 8 measures phase differences among the four channels of input signals which are output from the third HPF 7a~d to generate a DPDTE signal.

The CAPA detection signal generation circuit 9 receives the DPDTE signal outputted from the phase difference tracking error signal detection circuit 8, and detects up-down oscillation of the DPDTE signal of the CAPA (address mark) portion during RAM playback to output a CAPA detection signal.

The track cross signal generation circuit 10 receives the DPDTE signal outputted from the phase difference tracking error signal detection circuit 8, and binarizes the DPDTE signal at the zerocross point during DVD-ROM playback to generate a track cross signal to be output.

The off track signal generation circuit 11 performs comparison among the four channels of input signals which are output from the third HPF 7a~d, respectively, to generate an off track signal indicating whether off track occurs or not, and outputs the off track signal. As the comparison process, the digital signals after binarization are exclusive-ORed to perform comparison between the side-to-side signals (A/B and C/D), and it is judged as "on track" when there is a small difference while it is judged as "off track" when there is a large difference.

Next, the low frequency band processing circuit will be described in more detail with reference to FIG. 2.

In FIG. 2, the low frequency band processing circuit comprises VGA 12a~h, LPF 13a~h, a time-division AD converter 14, a low-speed track cross signal generation circuit 15, a servo error signal generation circuit 16, and a servo operation circuit 17. While in this first embodiment the low frequency band processing circuit is provided with eight VGA 12 and eight LPF 13, since the number of VGA 12 (LPF 13) is predetermined according to the number of signals from the photodetectors which are input to the low frequency band processing circuit, it is not necessarily restricted to eight.

The VGA 12a~h are, like the VGA 2a~d, gain adjustment amplifiers for correcting variations in the amplitudes of the photodetector output signals due to the reflectivity of the playback media, variations in the laser power, and the efficiency of the pickup and the like.

The LPF 13a~h are anti-aliasing filters each having a cutoff frequency equal to or lower than ½ of the low-band sampling frequency.

The time-division AD converter 14 performs time-division AD-conversion while successively switching the eight channels of signals outputted from the LPF 13a~h, and successively outputs the digitized signals from the photodetectors. The time-division AD converter 14 is a low-speed high-bit AD converter having a sampling frequency of about 2~5 MHz and a bit resolution of about 8~12 bits, and therefore, it has a relatively large input dynamic range and a relatively high bit resolution. It is assumed that the AD converter performs AD conversion so that the AD conversion frequency becomes 1.6 MHz when the servo sampling frequency is 200 KHz, and the bit resolution thereof is 10 bits.

The low-speed track cross signal generation circuit 15 operates three beam TE and pushpull TE by hard logic from the data of the low-speed AD conversion result, and binarizes them with an average value or a zerocross point to output a track cross signal.

The servo error signal generation circuit 16 is a processor such as a DSP, and performs, with micro codes, arithmetic processings suited to the pickup structure, playback media, playback mode and the like on the basis of the AD-converted output signals from the respective photodetectors, thereby generating TE signals, FE signals, and AS signals. The arithmetic processings performed by the servo error signal generation circuit 16 may be carried out by a logic circuit.

The servo operation circuit 17 performs a digital servo operation on the basis of the TE, FE, and AS signals generated by the servo error signal generation circuit 16 to generate a driving signal for a driving system.

Next, the operation of the optical disc device according to the present invention will be described.

Initially, the operation of the high frequency band processing circuit will be described.

When the signals outputted from the photodetectors A~D of the pickup are input to the high frequency band processing circuit, there are performed removal of amplifier offsets and stray light offsets due to the first HPF 1a~d, amplitude adjustment by the VGA 2a~d, removal of offsets by the second HPF 3a~d, and removal of level fluctuations in the playback signal that are caused by flaws on the disc or the like. Thereafter, the high frequency band signals from the photodetectors A~D are converted into digital signals by the ADC 4a~d, and outputted to the wobble signal generation circuit 5, the pushpull track cross signal generation circuit 6, and the third HPF 7a~d.

Since, as described above, the cutoff frequency of the first HPF 1a~d is set to a value (usually, 100~2 KHz) at which jitter of the RF signal is not degraded, the signals outputted through the VGA 2a~d, from which the low frequency band components are removed, can be used as an added RF signal. Thereby, generation of playback signals for data playback and generation of servo signals can be performed by a single circuit, leading to a reduction in circuit scale.

Next, the wobble signal generation circuit 5 that has received the four channels of digital signals outputted from the ADC 4a~d, calculates a broad-band pushpull TE, and generates, by a digital BPF, a wobble signal that exists when the disc is a DVD-R/RW or a DVD-RAM. By generating a wobble signal using the digital BPF, the circuit scale can be significantly reduced as compared with the case where the BPF is an analog circuit. Further, since the digital BPF has no variations in BPF characteristics, the BPF can be designed with a sufficient band width.

Further, the pushpull track cross signal generation circuit 6 which has received the four channels of digital signals outputted from the ADC 4a~d, calculates high-speed pushpull TEs, and binarizes them with an average of the high-speed pushpull TEs or a zerocross point, thereby generating a pushpull track cross signal.

During high-speed seeking, the pushpull track cross signal generated by the pushpull track cross signal generation circuit 6 is changed to a track cross signal to be generated by the low-speed track cross signal generation circuit 15 described later. Thereby, the track cross signal generated by the low-speed track cross signal generation circuit 20 is prevented from being degraded in quality, particularly when the track cross frequency is high.

Further, the third HPF 7a~d which have received the digital signals outputted from the ADC 4a~d perform removal of level fluctuations due to flaws on the disc and removal of wobble components, for DPDTE signal detection. Since the third HPF 7a~d are digital HPF, setting of a cutoff frequency of a higher degree of freedom is possible.

The four channels of digital signals outputted from the third HPF 7a~d are input to the phase difference tracking error signal detection circuit 8 and the off track signal generation circuit 11, and the phase difference tracking error signal detection circuit 8 detects a phase difference among the four channels of digital signals, and outputs the phase difference as a DPDTE signal.

Thereafter, the DPDTE signal is input to the CAPA detection signal generation circuit 9 and the track cross signal generation circuit 10, and the CAPA detection signal generation circuit 9 generates a CAPA detection signal during RAM playback while the track cross signal generation circuit 10 generates a track cross signal during DVD-ROM playback. The track cross signal generated by the track cross signal generation circuit 10 is available from a low-speed seek time to a high-speed seek time during DVD-ROM playback.

On the other hand, the off track signal generation circuit 11 performs comparison of the four channels of input signals which are output from the third HPF 7a~d to generate an off track signal indicating whether off track occurs or not.

Next, the operation of the low frequency band processing circuit will be described.

When the signals outputted from the photodetectors A~H of the pickup are inputted, gain adjustment is carried out by the VGA 12a~h, and the cutoff frequency that is ½ or lower than the low-band sampling frequency is removed by the LPF 13a~h. Thereafter, the eight channels of signals outputted from the LPF 13a~h are subjected to time-division AD conversion by the time-division AD converter 14, and the digitized signals from the photodetectors A~H are output to the low-speed track cross signal generation circuit 15 and to the servo error signal generation circuit 16.

The low-speed track cross signal generation circuit 15 receives the digital signals outputted from the time-division AD converter 14, operates 3 beam TE and pushpull TE by hard logic, and binarizes them at a zerocross point to generate a track cross signal.

Further, the servo error signal generation circuit 16 receives the digital signals outputted from the time-division AD converter 14, and executes, by micro codes, an arithmetic processing suited to the pickup structure, the playback media, and the playback mode, thereby to generate TE signals, FE signals, and AS signals. That is, the arithmetic processing to generate the TE signals, FE signals, and AS signals shown in FIGS. 21, 22, and 23 is executed on the basis of a program by a processor like a DSP.

Thereafter, the servo operation circuit 17 performs a digital servo operation on the basis of the TE signals, FE signals, and AS signals which are generated by the servo error signal generation circuit 16, thereby generating a driving signal for the driving system.

Therefore, the arithmetic operation corresponding to the pickup structure, the playback media, the playback mode and the like can be carried by only changing the micro codes, whereby the circuit scale and power consumption can be significantly reduced as compared with the conventional servo error signal generation circuit that comprises plural analog circuits corresponding to the pickup structure, the playback media, the playback mode and the like.

Further, since the operation by the servo error signal generation circuit 16 is carried out by the digital processing using the micro codes, the values k and a in the arithmetic operations shown in FIGS. 21 and 22 can be minutely adjusted, and analog variations such as an offset that likely occurs in an arithmetic operation by an analog circuit, thereby generating more accurate TE signals, FE signals, and AS signals.

As described above, in the optical disc device according to the first embodiment of the present invention, the signals outputted from the pickup are branched into two sequences, and one of the two sequences is processed by the high frequency band processing circuit including the HPFs while the other sequence is processed by the low frequency band processing circuit including LPFs, whereby the high-speed low-bit AD converters 4a~d can be used for high frequency band signal processing while the low-speed high-bit time-division AD converter 14 can be used for the low frequency band signal processing, and therefore, a low-cost digital system can be realized without using high-performance AD converters. Further, since the high frequency band and the low frequency band are processed separately, it becomes unnecessary to provide the high frequency band processing circuit and the low frequency band processing circuit with high-performance VGAs, resulting in a reduction in product costs.

Further, in the optical disc device according to the first embodiment of the present invention, the low-speed track cross signal generation circuit 15 of the low frequency band processing circuit generates a track cross signal to be used during normal operation, and further, the pushpull track cross signal generation circuit 6 of the high frequency band processing circuit generates a high-speed track cross signal. Therefore, during high-speed seeking, processing can be carried out using the high-speed track cross signal generated by the high frequency processing circuit.

Further, the high frequency band processing circuit is provided with the plural stages of HPFs having different cutoff frequencies which are in ascending order with respect to the signals outputted from the respective photodetectors of the pickup. Therefore, signals of desired frequency bands that are required for detecting plural kinds of signals can be obtained from the outputs of the respective HPFs, whereby various kinds of signals required for recording/playback of an optical disc can be detected by a single circuit.

Furthermore, in the high frequency band processing circuit, the digital data to be output to the wobble signal generation circuit 5, the pushpull track cross signal generation circuit 6, and the third HPFs 7a~d are generated using the ADC 4a~d, whereby it becomes unnecessary to provide the respective circuits with AD converters, and the circuit scale can be reduced, resulting in an optical disc device with reduced power consumption and reduced product costs.

Furthermore, in the high frequency band processing circuit, since the third HPFs 7a~d are digital HPFs, setting of cutoff frequencies with higher degree of freedom is realized, and the number of analog circuits can be reduced without degradation in performance, resulting in a reduction in circuit scale.

Further, since a wobble signal is generated using the digital BPF, the circuit scale can be significantly reduced as compared with the case where the BPF is constituted by an analog circuit. Further, since the digital BPF has no variations in BPF characteristics, the BPF can be designed with a sufficient band width, resulting in improved S/N of a playback wobble signal.

Furthermore, in the low frequency band processing circuit, after the output signals from the respective photodetectors are AD converted, the servo error signal generation circuit 16 digitally processes the signals using micro codes, whereby operations corresponding to the pickup structure, the playback media, the playback mode and the like can be carried out by only changing the micro codes, and further, the arithmetic constants used for generating TE signals, FE signals, and AS signals can be minutely adjusted. Therefore, analog variations such as an offset which likely occurs in operation using analog circuits can be avoided, thereby generating more accurate TE signals, FE signals, and AS signals.

Furthermore, in the low frequency band processing circuit, since the plural outputs from the photodetectors of the optical pickup are AD-converted using the time-division AD converter, it becomes unnecessary to provide plural AD converters for the respective photodetectors of the optical pickup, resulting in a reduction in circuit scale.

In the optical disc device according to the first embodiment of the present invention, in order to perform detection of various kinds of signals that are required for recording/playback of an optical disc, the high frequency band processing circuit is provided with the wobble signal generation circuit 5, the pushpull track cross signal generation circuit 6, the phase difference tracking error signal detection circuit 8, the CAPA detection signal generation circuit 9, the track cross signal generation circuit 10, and the off-track signal generation circuit 11, while the low frequency band processing circuit is provided with the low-speed track cross signal generation circuit 15, the servo error signal generation circuit 16, and the servo operation circuit 17. However, these components are merely examples, and the optical disc device according to the present invention may be provided with some of the components described above, or it may be provided with another component for detecting a desired signal from the optical disc.

Embodiment 2

Next, specific constructions and operations of the servo error signal generation circuit 16 and the servo operation circuit 17 which have been described for the first embodiment using FIG. 2 will be described as a second embodiment of the present invention. In the optical disc device described hereinafter, the servo error signal generation circuit 16 controls the operation timing of arithmetic processing for the signals from the main photodetectors A~D and the operation timing of arithmetic processing for the signals from the sub photodetectors E~H separately from each other, and the servo operation circuit 17 performs digital servo operation using the signals generated by the servo error signal generation circuit, thereby generating a drive signal for a driving system.

Figure 4A:
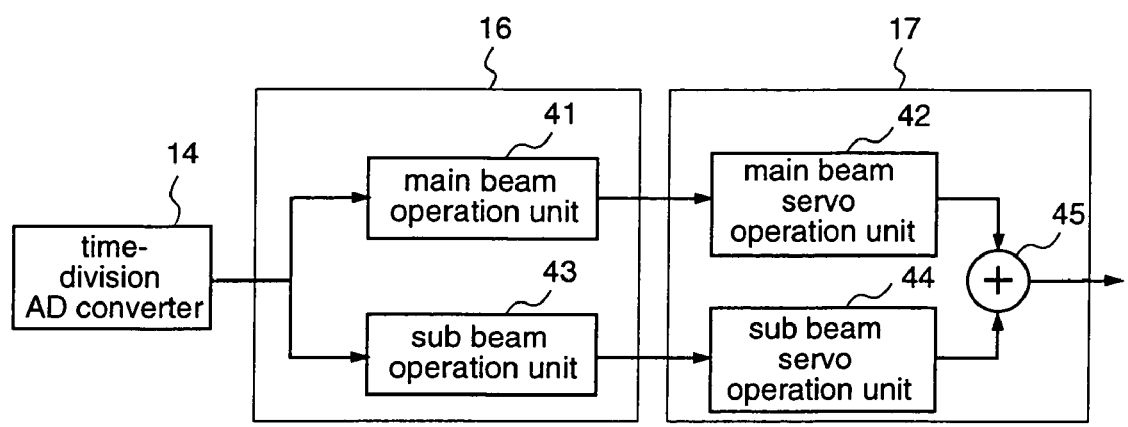
FIG. 4(a) is a block diagram illustrating examples of constructions of a servo error signal generation circuit and a servo operation circuit of an optical disc device according to a second embodiment of the present invention.
Figure 4B:
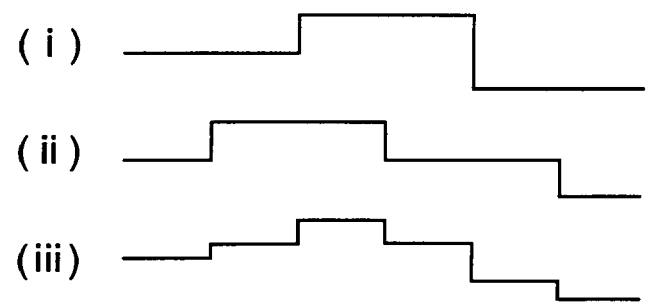
FIG. 4(b) is a signal diagram for explaining arithmetic processing to be performed by the servo operation unit of the optical disc device according to the second embodiment of the present invention.

FIGS. 4(a) and 4(b) are diagrams for explaining the servo error signal generation circuit and the servo operation circuit of the optical disc device according to the second embodiment of the invention. To be specific, FIG. 4(a) is a block diagram illustrating examples of constructions of the servo error signal generation circuit and the servo operation circuit, and FIG. 4(b) is a signal diagram for explaining arithmetic processing to be performed by the servo operation circuit.

In FIG. 4(a), the servo error signal generation circuit 16 according to the second embodiment of the invention comprises a main beam operation unit 41 and a sub beam operation unit 43, and the servo operation circuit 17 comprises a main beam servo operation unit 42 and a sub beam servo operation unit 44. A time-division AD converter 14 shown in FIG. 4(a) is identical to the time-division AD converter 14 shown in FIG. 2.

The main beam operation unit 41 is an operation circuit which performs arithmetic processing using the signals from the main photodetectors A~D among the signals from the photodetectors A~H, which are successively output from the time-division AD converter 14, thereby to generate a servo error signal based on the signals from the main photodetectors A~D. The main beam servo operation unit 42 generates a driving signal corresponding to the signals from the main photodetectors A~D on the basis of the servo error signal generated by the main beam operation unit 41.

Further, the sub beam operation unit 43 is an operation circuit which performs arithmetic processing using the signals from the sub photodetectors E~H among the signals of the photodetectors A~H, which are successively output from the time-division AD converter 14, thereby to generate a servo error signal based on the signals from the sub photodetectors E~H. The sub beam servo operation unit 44 generates a driving signal corresponding to the signals from the sub photodetectors E~H on the basis of the servo error signal generated by the sub beam operation unit 43.

At this time, the arithmetic processings of the main beam operation unit 41 and the main beam servo operation unit 42, and the arithmetic processings of the sub beam operation unit 43 and the sub beam servo operation unit 44 are carried out independently from each other at different operation timings.

An adder 45 adds the output signal from the main beam servo operation unit 42 and the output signal from the sub beam servo operation unit 44, and outputs the sum as a driving signal for the driving system.

In FIG. 4(b), (i)~(iii) indicate examples of the output signals from the main beam servo operation unit 42, the sub beam servo operation unit 44, and the adder 45, respectively. In the servo operation circuit 17 according to the present invention, the result of operation by the main beam servo operation unit 42 shown in FIG. 4(b)-(i) and the result of operation by the sub beam servo operation unit 44 shown in FIG. 4(b)-(ii) are added by the adder 45 to obtain the result of operation by the servo operation circuit 17 shown in FIG. 4(b)-(iii).

Next, the operations of the servo error signal generation circuit 16 and the servo operation circuit 17 according to the second embodiment of the invention will be described, performing a comparison between the case where the arithmetic processing according to the second embodiment is carried out and the case where it is not carried out.

FIGS. 5(a) and 5(b) are timing charts for explaining the arithmetic processings by the servo error signal generation circuit and the servo operation circuit of the optical disc device according to the second embodiment of the present invention. FIG. 5(a) shows the operation in the case where the arithmetic processing according to the second embodiment is not carried out, and FIG. 5(b) shows the operation in the case where the arithmetic processing according to the second embodiment is carried out.

Initially, the operation in the case where the arithmetic processing according to the second embodiment is not carried out will be described with reference to FIG. 5(a).

FIG. 5(a)-(i) indicates the order of AD conversions for the output signals A~H from the two sets of four-part split photodetectors, which are input to the time-division AD converter 14. As shown in the figure, the signals from the sub photodetectors E~H are selected after the signals from the main photodetectors A~D, and subjected to AD conversion. FIG. 5(a)-(iii) indicates a servo sampling period, FIG. 5(a)-(iii) indicates a sampling timing of an analog signal, which sampling is performed by the time-division AS converter 14, and FIG. 5(a)-(iv) indicates a conversion timing to a digital signal. Further, FIG. 5(a)-(v) indicates a start timing of arithmetic operation for generating a servo error signal by the servo error signal generation circuit 16, FIG. 5(a)-(vi) indicates start timings of servo operations by the servo error signal generation circuit 16 and the servo operation circuit 17, and FIG. 5(a)-(vii) indicates an output timing of a driving signal that is generated by the servo operation circuit 17.

In the arithmetic processings by the servo error signal generation circuit 16 and the servo operation circuit 17 shown in FIG. 5(*a*), the arithmetic processing for the signals from the photodetectors A~H is started at the start timing shown in FIG. 5(*a*)-(v), and therefore, arithmetic processing by the servo error signal generation circuit 6 is carried out after receiving the signal outputted from the photodetector D, from the time-division AD converter 14, in order to reduce the operation time of the signals from the main photodetectors A~D (main (1) in FIG. 5(*a*)) and the delay time in the output of the result.

Therefore, the signals from the sub photodetectors E~H (sub (1) in FIG. 5(*a*)) have not yet been input to the operation unit at the operation start time, and consequently, arithmetic processing for the signals from the sub photodetectors E~H are carried out during arithmetic processing for the signals from the main photodetectors A~D (main (2) in FIG. 5(*a*)) after one sampling period.

That is, in the normal arithmetic processings by the servo error signal generation circuit 16 and the servo operation circuit 17, when performing arithmetic processing for the signals from the main photodetectors A~D (main (1)), arithmetic processing for the signals from the sub photodetectors E~H (sub (0)), which is one sampling period previous processing, is carried out, and the sum of the arithmetic result of the signals from the main photodetectors A~D (main (1)) and the one-sampling-period previous arithmetic result of the signals from the sub photodetectors E~H (sub (0)) is outputted as a driving output (refer to FIG. 5(*a*)-(vii)).

Thereby, as shown in FIG. 5(*a*)-(vii), the maximum arithmetic delay time T2 of the signals corresponding to the sub photodetectors E~H becomes considerably large, while the maximum arithmetic delay time T1 of the signals from the main photodetectors A~D can be reduced.

So, in the second embodiment of the invention, as shown in FIG. 4 and FIG. 5(*b*), the arithmetic processing for the signals from the main photodetectors A~D and the arithmetic processing for the signals from the sub photodetectors E~H are independently carried out at different operation timings.

Hereinafter, a description will be given of FIG. 5(*b*). FIGS. 5(*b*)-(i)~(iv) are identical to FIGS. 5(*a*)-(i)~(iv).

FIG. 5(*b*)-(v) indicates the start timing of a servo error signal generation operation by the main beam operation unit 41 shown in FIG. 4(*a*), and FIG. 5(*b*)-(vi) indicates the start timing of a servo error signal generation operation by the sub beam operation unit 43 shown in FIG. 4(*a*). Further, FIG. 5(*b*)-(vii) indicates the start timings of servo operations by the servo error signal generation circuit 16 and the servo operation circuit 17, and FIG. 5(*b*)-(viii) indicates the output timing of a driving signal generated by the servo operation circuit 17.

In the arithmetic processings by the servo error signal generation circuit 16 and the servo operation circuit 17 according to the invention shown in FIG. 5(*b*), as shown in FIGS. 5(*b*)-(v) and (vi), the arithmetic processing for the signals from the main photodetectors A~D and the arithmetic processing for the signals from the sub photodetectors E~H are independently performed at different operation timings by the servo error signal generation circuit 16 and the servo operation circuit 17, and the sum of the arithmetic result corresponding to the main photodetectors and the arithmetic result corresponding to the sub photodetectors is successively output as a driving signal. That is, as shown in FIG. 5(*b*)-(viii), after outputting the sum of the arithmetic result (sub (0)) of the signals from the one-sampling-period-previous sub photodetectors E~H and the arithmetic result (main (1)) of the signals from the main photodetectors A~D, the sum of the arithmetic result (main (1)) of the signals from the main photodetectors A~D and the arithmetic result (sub (1)) of the signals from the sub photodetectors E~H is output.

Thereby, the maximum arithmetic delay time T4 comprising a delay in the operation for the output signals from the sub photodetectors E~H and the outputting of the result becomes equal to the maximum arithmetic delay time T3 comprising a delay in the operation for the output signals from the main photodetectors A~D and the outputting of the result, whereby the maximum arithmetic delay time T4 can be significantly reduced with respect to the maximum arithmetic delay time T2 of the signals from the sub photodetectors E~H shown in FIG. 5(*a*) (refer to FIG. 5(*b*)-(viii)).

As described above, in the optical disc device according to the second embodiment of the invention, the arithmetic processing for the signals from the main photodetectors A~D and the arithmetic processing for the signals from the sub photodetectors E~H are independently carried out, whereby a more accurate driving signal can be obtained using the respective arithmetic results, and further, the delay times in the arithmetic processings by the servo error signal generation circuit 16 and the servo operation circuit 17 and in the outputting of the results can be minimized.

In this second embodiment of the invention, after the driving outputs based on the main beam and the sub beam are generated by the main beam servo operation unit 42 and the sub beam servo operation unit 44, respectively, the driving outputs are added using the adder 45, and the sum is output as a driving output. In the present invention, however, the servo error signal generation circuit 16 controls the operation timing of the arithmetic processing for the signals from the main photodetectors A~D and the operation timing of the arithmetic processing for the signals from the sub photodetectors E~H independently from each other, and the servo operation circuit 17 performs a digital servo operation using the signals generated by the servo error signal generation circuit to generate a driving signal for the driving system. For example, after generating servo error signals based on the main and sub beams independently by the main beam operation unit 41 and the sub beam operation unit 43, respectively, the sum of the servo error signals may be obtained by the adder 45, and a servo operation may be performed on the basis of the sum to generate a driving output.

Embodiment 3

Next, other examples of the servo error signal generation circuit 16 and the servo operation circuit 17, which have been described for the second embodiment, will be described as a third embodiment of the present invention. According to the servo error signal generation circuit 16 and the servo operation circuit 17 of the optical disc device to be described hereinafter, the servo operation circuit 17 is provided with a high-pass phase-lead filter 65 for compensating, by phase compensation, a delay time until the start of the arithmetic processing for the signals from the sub photodetectors E~H thereby to compensate a phase delay due to the operation delay time for the signals from the sub photodetectors E~H.

Figure 6:
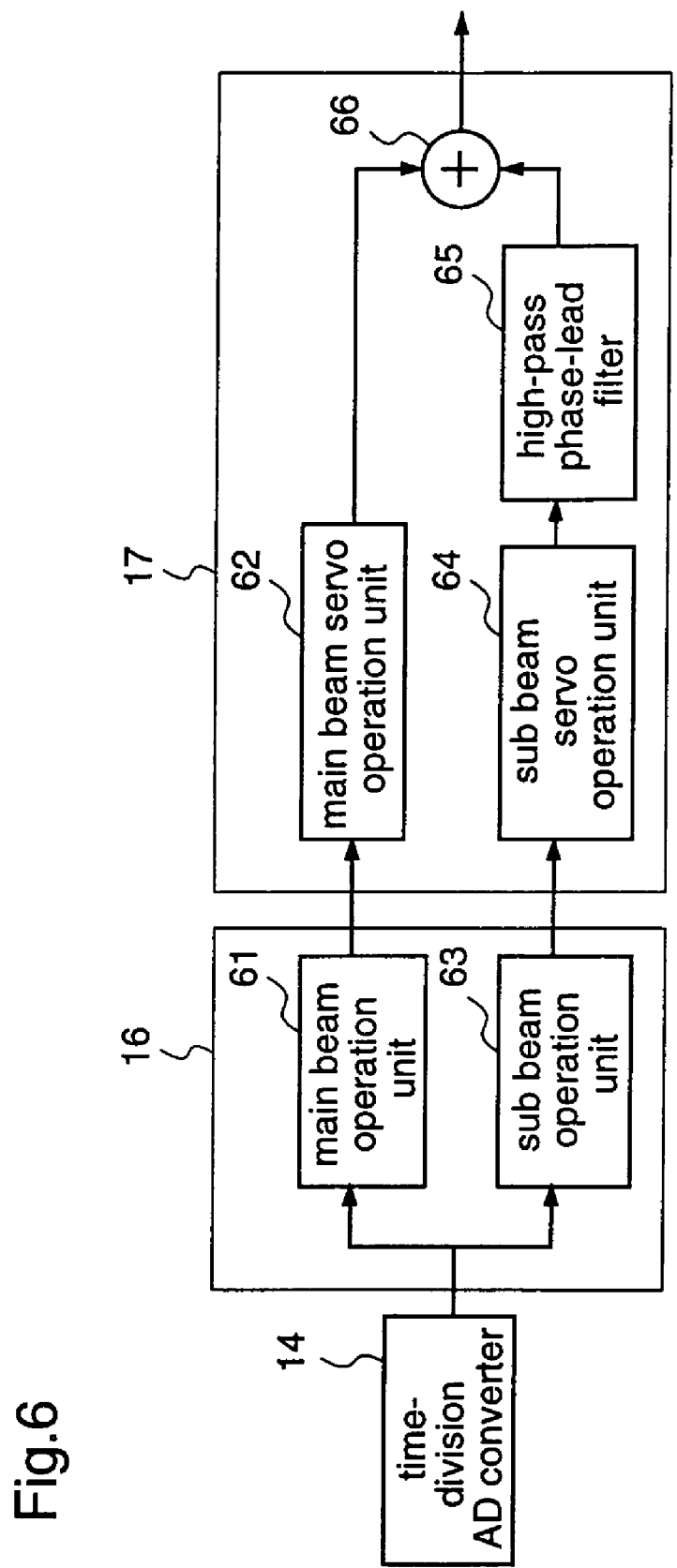
FIG. 6 is a block diagram illustrating examples of constructions of a servo error signal generation circuit and a servo operation circuit of an optical disc device according to a third embodiment of the present invention.

FIG. 6 is a block diagram illustrating examples of constructions of the servo error signal generation circuit and the servo operation circuit according to the third embodiment.

In FIG. 6, the servo error signal generation circuit 16 according to the third embodiment comprises a main beam operation unit 61 and a sub beam operation unit 63, and the servo operation circuit 17 comprises a main beam servo operation unit 62, a sub beam servo operation unit 64, a high-pass phase-lead filter 65, and an adder 66. A time-division AD converter 14 shown in FIG. 6 is identical to the time-division AD converter 14 shown in FIG. 2.

The main beam operation unit 61 is an operation circuit that performs arithmetic processing using the signals from the main photodetectors A~D among the signals of the photodetectors A~H, which are successively output from the time-division AD converter 14, thereby to generate a servo error signal based on the signals from the main photodetectors A~D. The main beam servo operation unit 62 generates a driving signal for the signals from the main photodetectors A~D on the basis of the servo error signal generated by the main beam operation unit 61.

Further, the sub beam operation unit 63 is an operation circuit that performs arithmetic processing using the signals from the sub photodetectors E~H among the signals of the photodetectors A~H, which are successively output from the time-division AD converter 14, thereby to generate a servo error signal based on the signals from the sub photodetectors E~H. The sub beam servo operation unit 64 generates a driving signal for the signals from the sub photodetectors E~H on the basis of the servo error signal generated by the sub beam operation unit 63.

The high-pass phase-lead filter 65 performs phase compensation for the driving signal outputted from the sub beam servo operation unit 64, and it compensates, by phase compensation, a delay time until the start of the arithmetic processing for the signals from the photodetectors receiving the sub beam with respect to the start time of the arithmetic processing for the signals from the photodetectors receiving the main beam.

Further, the adder 66 adds the output signal from the main beam servo operation unit 62 and the output signal from the high-pass phase-lead filter 65, and finally outputs the result of addition as a driving signal for the driving system.

Next, the operation will be described.

Among the signals of the photodetectors A~H which are output from the time-division AD converter 14, the signals from the main photodetectors A~D are input to the main beam operation unit 61 while the signals from the sub photodetectors E~H are input to the sub beam operation unit 63.

At this time, if the arithmetic processing for the input signal to the servo error signal generation circuit 16 according to the third embodiment and outputting of the result are carried out at the same timing as the timing of the arithmetic processing shown in FIG. 5(*a*), the arithmetic processing for the signals from the sub photodetectors E~H in the previous sampling period is carried out after the arithmetic processing for the signals from the main photodetectors A~D, and therefore, a maximum arithmetic delay time T2 shown in FIG. 5(*a*) occurs as described above.

This delay time appears as a phase delay in the frequency in the vicinity of a gain intersection point of open-loop characteristic of the operation unit, and causes degradation of servo characteristic.

So, in the servo error signal generation circuit 16 and the servo operation circuit 17 according to the third embodiment of the invention, the servo operation circuit 17 is provided with the high-pass phase-lead filter 65, and the phase delay caused by the arithmetic delay time with respect to the signals from the sub photodetectors E~H is compensated by the high-pass phase-lead filter 65.

Hereinafter, the phase compensation by the high-pass phase-lead filter 65 will be described in detail.

Figure 7B:
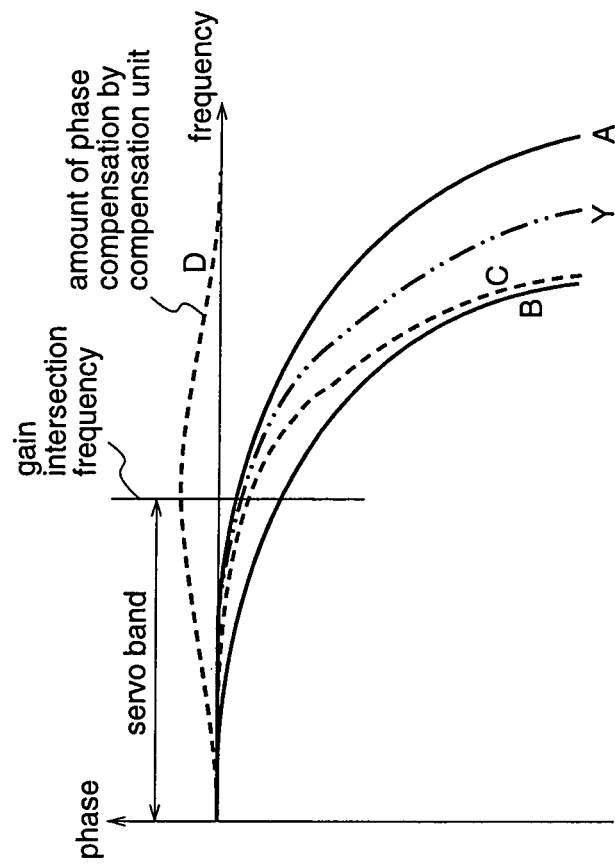
FIG. 7(b) is a diagram illustrating phase delays in the case where phase compensation by a high-pass phase-lead filter is carried out.
Figure 7A:
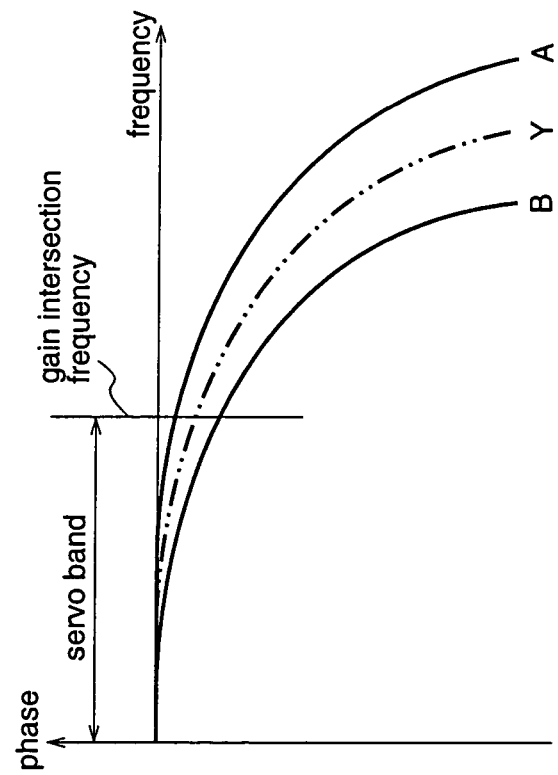
FIG. 7(a) is a diagram illustrating phase delays in the case where phase compensation by a high-pass phase-lead filter is not carried out.

FIGS. 7(*a*) and 7(*b*) are diagrams for explaining the phase compensation by the high-pass phase-lead filter, and FIG. 7(*a*) shows phase delays in the case where phase compensation is not carried out while FIG. 7(*b*) shows phase delays in the case where phase compensation is carried out. In the figures, A indicates a phase delay due to an arithmetic delay in the arithmetic processing for the signals from the main beam photodetectors, B indicates a phase delay due to an arithmetic delay in the arithmetic processing for the signals from the sub beam photodetectors, C indicates the phase characteristic obtained by phase-compensating the phase delay, Y indicates the result of addition of A and B, and D indicates the phase characteristic to be compensated by the high-pass phase-lead filter.

As shown in FIG. 7(*a*), when no phase compensation is carried out, the phase delay (FIG. 7(*a*)-B) due to the arithmetic delay in the arithmetic processing for the signals from the sub beam photodetectors is larger than the phase delay (FIG. 7(*a*)-A) due to the arithmetic delay in the arithmetic processing for the signals from the main beam photodetectors, resulting in a phase delay (FIG. 7(*a*)-Y) in the frequency in the vicinity of or higher than the gain intersection frequency of the output signal Y that is the result of addition of A and B, which phase delay degrades servo characteristic.

So, in the present invention, the result of arithmetic operation performed on the signals from the sub photodetectors E~H by the sub beam servo operation unit 64 is subjected to compensation of the phase delay due to the delay time T2 by the high-pass phase-lead filter 65. Then, the arithmetic result outputted from the main beam servo operation unit 62 is added to the arithmetic result from the sub beam servo operation unit 64 which is phase-compensated by the high-pass phase-lead filter 65, and outputs the sum as an arithmetic result by the servo operation unit 16.

FIG. 7(*b*) illustrates the above-mentioned situation. FIG. 7(*b*)-A and FIG. 7(*b*)-B are identical to FIG. 7(*a*), and FIG. 7(*b*)-D shows the phase characteristic obtained by compensating the phase delay in FIG. 7(*b*)-B within the servo band by the high-pass phase-lead filter 65. The amount of phase compensation is set at a value equal to a difference between the phase delay due to the arithmetic delay with respect to the signals from the sub beam photodetectors within the servo band, and the phase delay due to the arithmetic delay with respect to the signals from the main beam photodetectors.

As the result, the phase characteristic of the phase-compensated signal C (FIG. 7(*b*)-C) within the servo band can be approximately equal to the phase delay A due to the arithmetic delay with respect to the signals from the main beam photodetectors. Further, the phase characteristic of the output signal Y (FIG. 7(*b*)-Y) as the sum of A and C becomes approximately equal to the phase delay due to the arithmetic delay with respect to the signals from the main beam photodetectors.

As described above, according to the optical disc device of the third embodiment, the phase delay due to the arithmetic delay time with respect to the signals of the sub photodetectors E~H is compensated using the high-pass phase-lead filter 65, whereby an increase in the phase delay due to the processing delay time of the signals from the sub photodetectors E~H can be compensated, thereby preventing degradation in servo characteristics.

In the third embodiment of the invention, the driving outputs from the main beam servo operation unit 62 and the high-pass phase-lead filter 65 are added using the adder 66. However, in the present invention, the delay time until the start of the arithmetic processing for the signals from the photodetectors receiving the sub beam with respect to the start time of the arithmetic processing for the signals from the photodetectors receiving the main beam is compensated by phase compensation using the high-pass phase-lead filter. For example, after generating servo error signals by the main beam operation unit 41 and the sub beam operation unit 43, the servo error signals generated by the sub beam operation unit 43 are phase-compensated using the high-pass phase-lead filter 65, and the servo error signals outputted from the main beam operation unit 41 and the high-pass phase-lead filter 65 are added using the adder 45, and thereafter, a driving output is generated on the basis of the sum.

While in the third embodiment of the invention each of the servo error signal generation circuit 16 and the servo operation circuit 17 is provided with two operation units. However, in this present invention, the delay time until the start of the arithmetic processing for the signals from the photodetectors receiving the sub beam with respect to the start time of the arithmetic processing for the signals from the photodetectors receiving the sub beam is compensated by phase compensation using the high-pass phase-lead filter. For example, AD conversion results which are successively output from the time-division AD converter 14 may be time-divisionally processed using an operation unit.

Further, while the optical disc device according to any of the first to third embodiments is provided with the pickup having the structure shown in FIG. 3, the pickup is not restricted thereto. Any pickup may be employed so long as it can irradiate the photodetectors with a main beam and a sub beam, and the photodetectors output four signals corresponding to the main beam and two or four signals corresponding to the sub beam.

Embodiment 4

Next, specific construction and operation of the servo error signal generation circuit 16, which has been described for the first embodiment using FIG. 2, will be described as a fourth embodiment of the present invention. The servo error signal generation circuit 16 of the optical disc device to be described hereinafter performs generation of plural servo error signals time-divisionally using a single operation unit.

Figure 8:
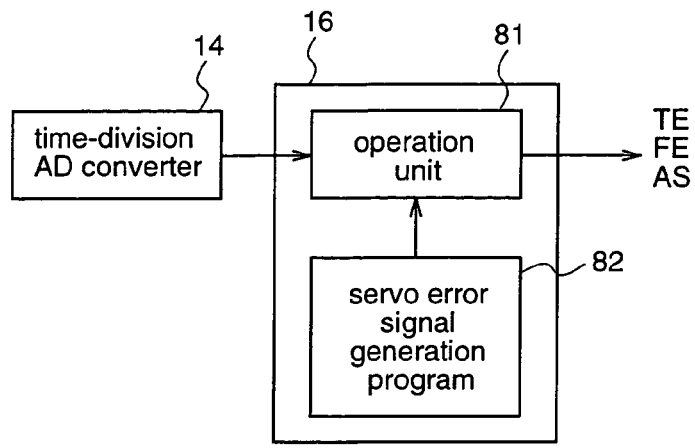
FIG. 8 is a block diagram illustrating an example of construction of a servo error signal generation circuit of an optical disc device according to a fourth embodiment of the present invention.

FIG. 8 is a block diagram illustrating an example of construction of the servo error signal generation circuit 16 according to the fourth embodiment of the invention.

In FIG. 8, the servo error signal generation circuit 16 comprises an operation unit 81, and a servo error signal generation program 82. The time-division AD converter 14 shown in FIG. 8 is identical to the time-division AD converter 14 shown in FIG. 2.

The operation unit 81 performs a servo error signal generation operation using the servo error signal generation program 82 to time-divisionally generate plural servo error signals. To be specific, the operation unit 81 performs conditional branching in accordance with the structure of the optical pickup, the recording/playback media, and the recording/playback mode, for every type of a servo error signal to be generated, and constitutes a servo error signal generation program 82 that satisfies the condition, and thereafter, performs arithmetic operation to generate plural kinds of servo error signals.

The servo error signal generation program 82 is a program for generating plural servo error signals, and enables generation of plural servo error signals with one program by performing conditional branching according to the structure of the optical pickup, the recording/playback media, and the recording/playback mode.

Next, the operation of the servo error signal generation circuit 16 according to the fourth embodiment of the invention will be described.

The digitized information of the amount of light received by the photodetectors A~H, which is output from the time-division AD converter 14, is input to the operation unit 81 of the servo error signal generation circuit 16. In the operation circuit 81, servo error signal generating operation is carried out using the servo error signal generation program 82 for generating plural servo error signals, and generation of plural kinds of servo error signals according to the structure of the optical pickup, the recording/playback media, and the recording/playback mode is time-divisionally carried out.

As described above, in the servo error signal generation circuit 16 according to the fourth embodiment of the invention, the plural output signals from the photodetectors of the optical pickup are time-divisionally AD-converted, and the servo error signal generation circuit 16 performs operation for generating servo error signals by digital processing. Therefore, the circuit scale and power consumption can be reduced, and the arithmetic operation for generating servo error signals is prevented from varying, resulting in improved arithmetic precision.

Further, since the servo error signal generation circuit 16 for generating servo error signals performs the servo error signal generation operation using the servo error signal generation program 82, plural kings of servo error signals can be generated by an operation unit without the necessity of providing digital circuits as many as servo error signals to be generated, resulting in a reduction in circuit scale.

Embodiment 5

Next, another example of the servo error signal generation circuit 16 which is described for the fourth embodiment will be described as a fifth embodiment of the invention. The servo error signal generation circuit 16 of the optical disc device described hereinafter is previously provided with plural programs according to the structure of a predetermined optical pickup, the recording/playback media, and the recording/playback mode, in contrast to the servo error signal generation circuit described for the fourth embodiment using FIG. 8.

Figure 9:
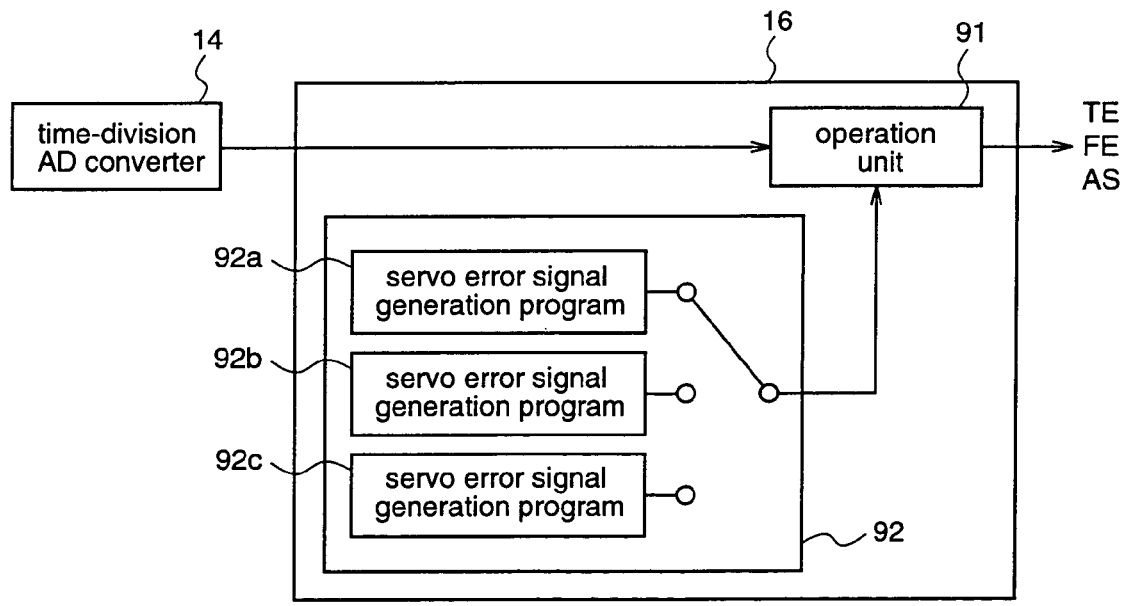
FIG. 9 is a block diagram illustrating an example of construction of a servo error signal generation circuit of an optical disc device according to a fifth embodiment of the present invention.

FIG. 9 is a block diagram illustrating an example of construction of the servo error signal generation circuit 16 according to the fifth embodiment of the invention.

In FIG. 9, the servo error signal generation circuit 16 according to the fifth embodiment comprises an operation unit 91, and servo error signal generation programs 92a~c. The time-division AD converter 14 shown in FIG. 9 is identical to the time-division AD converter 14 shown in FIG. 2.

The operation unit 91 selects the servo error signal generation programs 92a~c according to the structure of the optical pickup, the recording/playback media, and the recording/playback mode to perform a servo error signal generation operation, and generates plural kinds of servo error signals according to the structure of the optical pickup, the recording/playback media, and the recording/playback mode.

The servo error signal generation programs 92a~c are programs for performing servo error signal generation operations according to the structure of the optical pickup, the recording/playback media, and the recording/playback mode. In order to simplify the description, this fifth embodiment employs three servo error signal generation programs 92. However, the number of programs to be previously stored is not particularly limited.

Next, the operation of the servo error signal generation circuit 16 according to the fifth embodiment of the invention will be described.

The digitized information of the amount of light received by the photodetectors A~H, which is output from the time-division AD converter 14, is input to the operation unit 91 of the servo error signal generation circuit 16. In the operation unit 91, a target servo error signal generation program 92 adapted to the structure of the optical pickup, the recording/playback media, and the recording/playback mode is selected from among the plural servo error signal generation programs 92a~c, and a servo error signal generation operation is carried out using the selected servo error signal generation program 92. When generating plural kinds of servo error signals using an operation unit 91, the above-mentioned processing is time-divisionally carried out.

As described above, the servo error signal generation circuit 16 according to the fifth embodiment of the invention is provided with a plurality of servo error signal generation programs 92 adapted to the structure of the optical pickup, the recording/playback media, and the recording/playback mode, and selects an optimum servo error signal generation program from among these programs during servo error signal generation to carry out a servo matrix operation. Therefore, the process of conditional branching in servo matrix operation can be dispensed with, and generation of servo error signals can be carried out using a low-speed operation unit.

While in this fifth embodiment the servo error signal generation circuit 16 has the servo error signal generation programs 92, the servo error signal generation circuit 16 may have the servo error signal generation program 82 described for the fourth embodiment as well as the servo error signal generation programs 92 described for the fifth embodiment, and it may select a program to be used in accordance with the type of the servo error signal to be generated.

Embodiment 6

Next, another example of the servo error signal generation circuit 16 described for the fourth embodiment will be described as a sixth embodiment of the present invention. The servo error signal generation circuit 16 of the optical disc device described hereinafter is provided with plural programs which are adapted to the structure of the optical pickup, the recording/playback media, and the recording/playback mode, for every kind of servo error signal, in contrast to the servo error signal generation circuit described for the fourth embodiment using FIG. 8.

Figure 10:
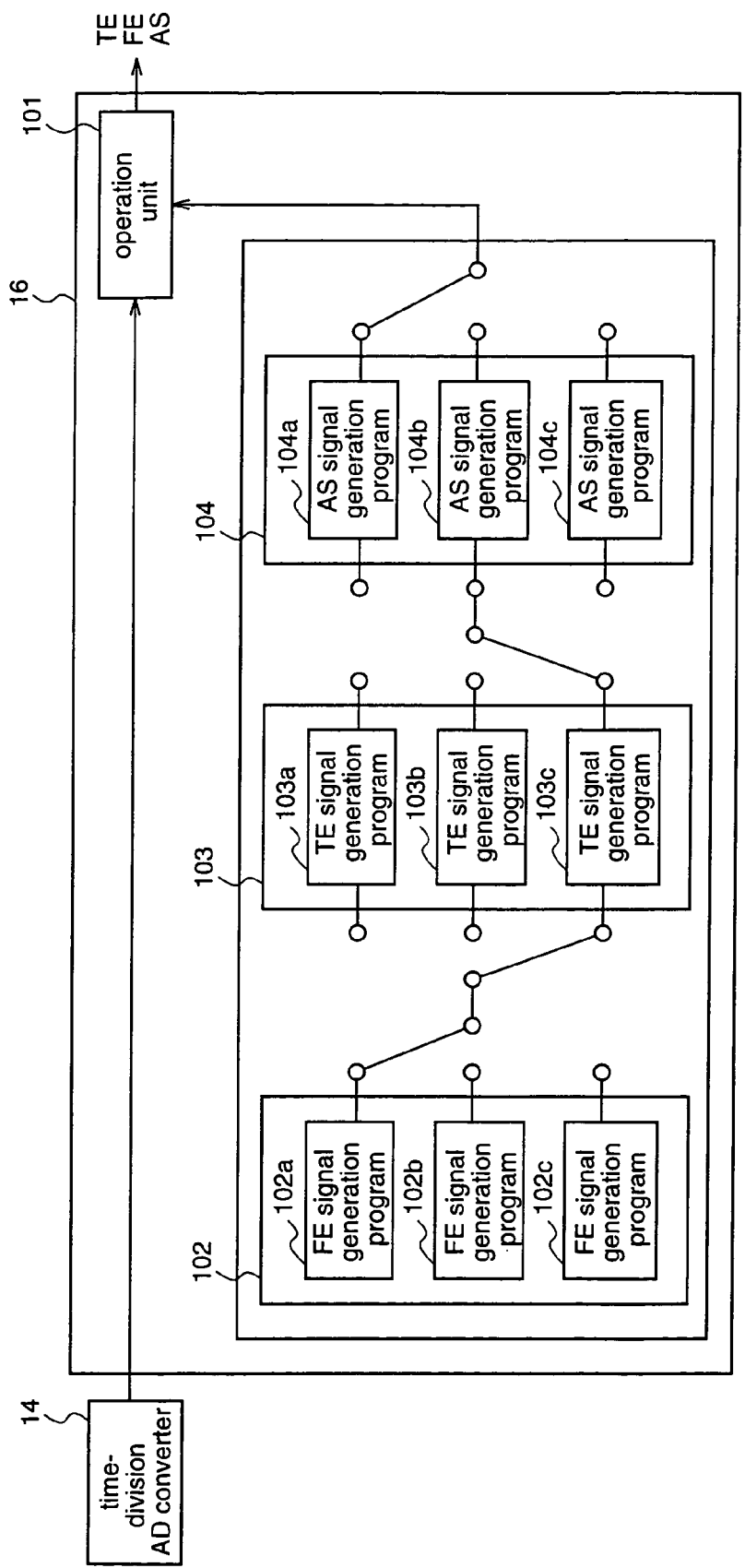
FIG. 10 is a block diagram illustrating an example of construction of a servo error signal generation circuit of an optical disc device according to a fifth embodiment of the present invention.

FIG. 10 is a block diagram illustrating an example of construction of the servo error signal generation circuit 16 according to the sixth embodiment of the invention.

In FIG. 10, the servo error signal generation circuit 16 according to the sixth embodiment comprises an operation unit 101, FE signal generation programs 102a~c, TE signal generation programs 103a~c, and AS signal generation programs 104a~c. A time-division AD converter 14 shown in FIG. 10 is identical to the time-division AD converter 14 shown in FIG. 2.

The operation unit 101 selects the servo error signal generation programs 102~104 adapted to the structure of the optical pickup, the recording/playback media, and the recording/playback mode from among the FE signal generation programs 102a~c, the TE signal generation programs 103a~c, and the AS signal generation programs 104a~c, respectively, and performs servo error signal generation, thereby generating FE signals, TE signals, and AS signals.

The FE signal generation programs 102a~c are servo error signal generation programs for generating FE signals adapted to the structure of the optical pickup, the recording/playback media, and the recording/playback mode.

The TE signal generation programs 103a~c are servo error signal generation programs for generating TE signals adapted to the structure of the optical pickup, the recording/playback media, and the recording/playback mode.

The AS signal generation programs 104a~c are servo error signal generation programs for generating AS signals adapted to the structure of the optical pickup, the recording/playback media, and the recording/playback mode.

In order to simplify the description, it is assumed that each of the FE signal generation program 102, the TE signal generation program 103, and the AS signal generation program 104 comprises three programs. However, the number of programs to be stored previously is not particularly limited.

Next, the operation of the servo error signal generation circuit 16 according to the sixth embodiment of the invention will be described.

The digitized information of the amount of light received by the photodetectors A~H and outputted from the time-division AD converter 14 is input to the operation unit 101 of the servo error signal generation circuit 16. In the operation unit 101, an FE signal generation program 102, a TE signal generation program 103, and an AS signal generation program 104 suited to the structure of the optical pickup, the recording/playback media, and the recording/playback mode are selected from among the FE signal generation program 102a~c, the TE signal generation programs 103a~c, and the AS signal generation programs 104a~c, respectively, and servo error signal generation is carried out using the selected servo error signal generation programs. The generation of the FE signals, the TE signals, and the AS signals is time-divisionally carried out.

As described above, the servo error signal generation circuit 16 is provided with the plural servo error signal generation programs adapted to the structure of the optical pickup, the recording/playback media, and the recording/playback mode, for every kind of servo error signal, and selects an optimum servo error signal generation program from among these programs during servo error signal generation, thereby to carry out servo matrix operation. Therefore, the conditional branching process in the servo matrix operation can be dispensed with, and servo error signal generation can be carried out using a low-speed operation unit.

Next, the operation of the operation unit 101 of the servo error signal generation circuit 16 according to the sixth embodiment will be described in more detail.

During the operation of the operation unit 101 of the servo error signal generation circuit 16 according to the sixth embodiment, the operation unit 101 changes the operation frequencies of the servo error signal generation programs 102~104 which are provided for every kind of servo error signal, according to the type of the servo error signal to be generated.

Figure 11:
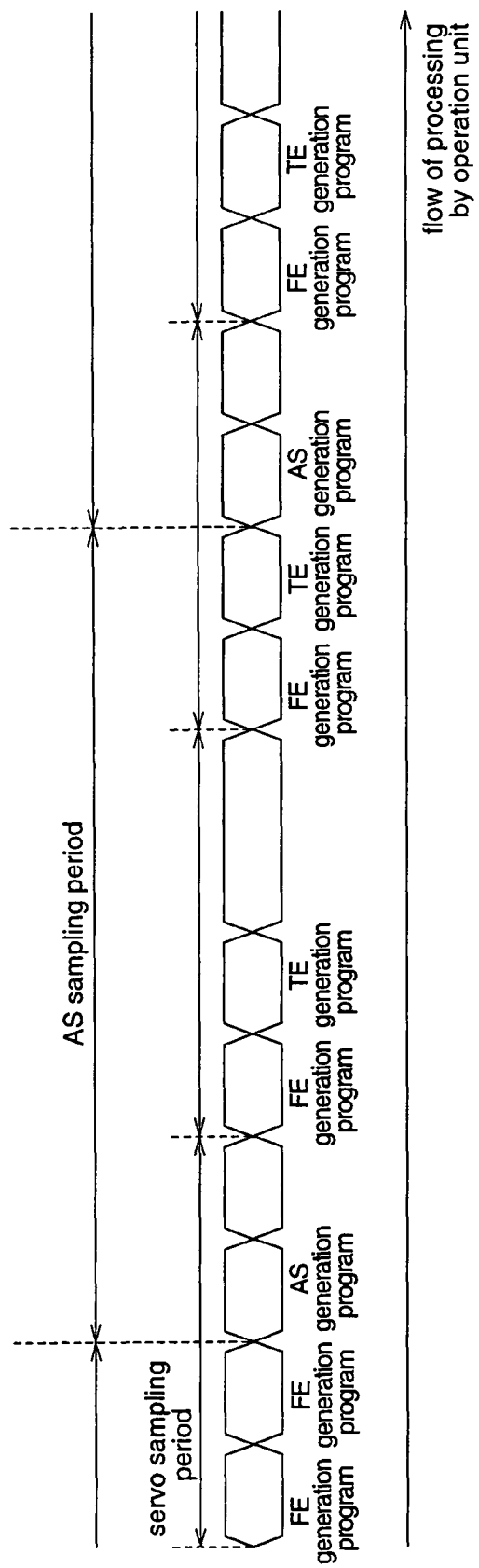
FIG. 11 is a diagram illustrating an example of arithmetic processing by the servo error signal generation circuit of the optical disc device according to the sixth embodiment of the present invention.

FIG. 11 is a diagram illustrating an example of servo error signal generation to be performed by the operation unit 101 of the servo error signal generation circuit 16 according to the sixth embodiment.

As shown in FIG. 11, in this sixth embodiment, when the operation unit 101 generates FE signals, TE signals, and AS signals, the operation frequency of the AS signal generation program for the AS signal that is a servo error signal of a low frequency band is lowered as compared with the operation frequencies of the generation programs of the other servo error signals, i.e., the FE signal and TE signal.

Thereby, only the sampling period of the AS signal that is a servo error signal of a low frequency band can be lowered, and therefore, the arithmetic processing burden on the operation unit 101 can be reduced while maintaining precision of the driving signal for the driving system which is generated according to the servo error signals.

As described above, the servo error signal generation circuit 16 according to the sixth embodiment is provided with the plural servo error signal generation programs for generating plural kinds of servo error signals, which are previously adapted to the structure of the optical pickup, the recording/playback media, and the recording/playback mode, and selects an optimum servo error signal generation program from among these servo error signal generation programs when performing servo error signal generation, and further, changes the operation frequencies of the servo error signal generation programs according to the kind of servo error signal, whereby the arithmetic processing burden on the operation unit 101 of the servo error signal generation circuit 16 can be reduced, and therefore, generation of servo error signals can be carried out using a low-speed operation unit.

While in this sixth embodiment the servo error signal generation circuit 16 has the servo error signal generation programs 102~104, the servo error signal generation circuit 16 may have at least one of the servo error signal generation programs 82 and 92 described for the fourth and fifth embodiments, respectively, as well as the servo error signal generation programs 102~104 according to the sixth embodiment, and select a program to be used according to the type of a servo error signal to be generated.

Embodiment 7

Next, another example of the low frequency band processing circuit which has been described for the first embodiment using FIG. 2 will be described as a seventh embodiment of the present invention. The low frequency band processing circuit of the optical disc device described hereinafter reduces a phase delay when generating plural servo error signals using an operation unit, by controlling the AD conversion end timing of the time-division AD converter 14 and the AD conversion result acquisition timing of the servo error signal generation circuit 16, using a timing control circuit 121.

Figure 12:
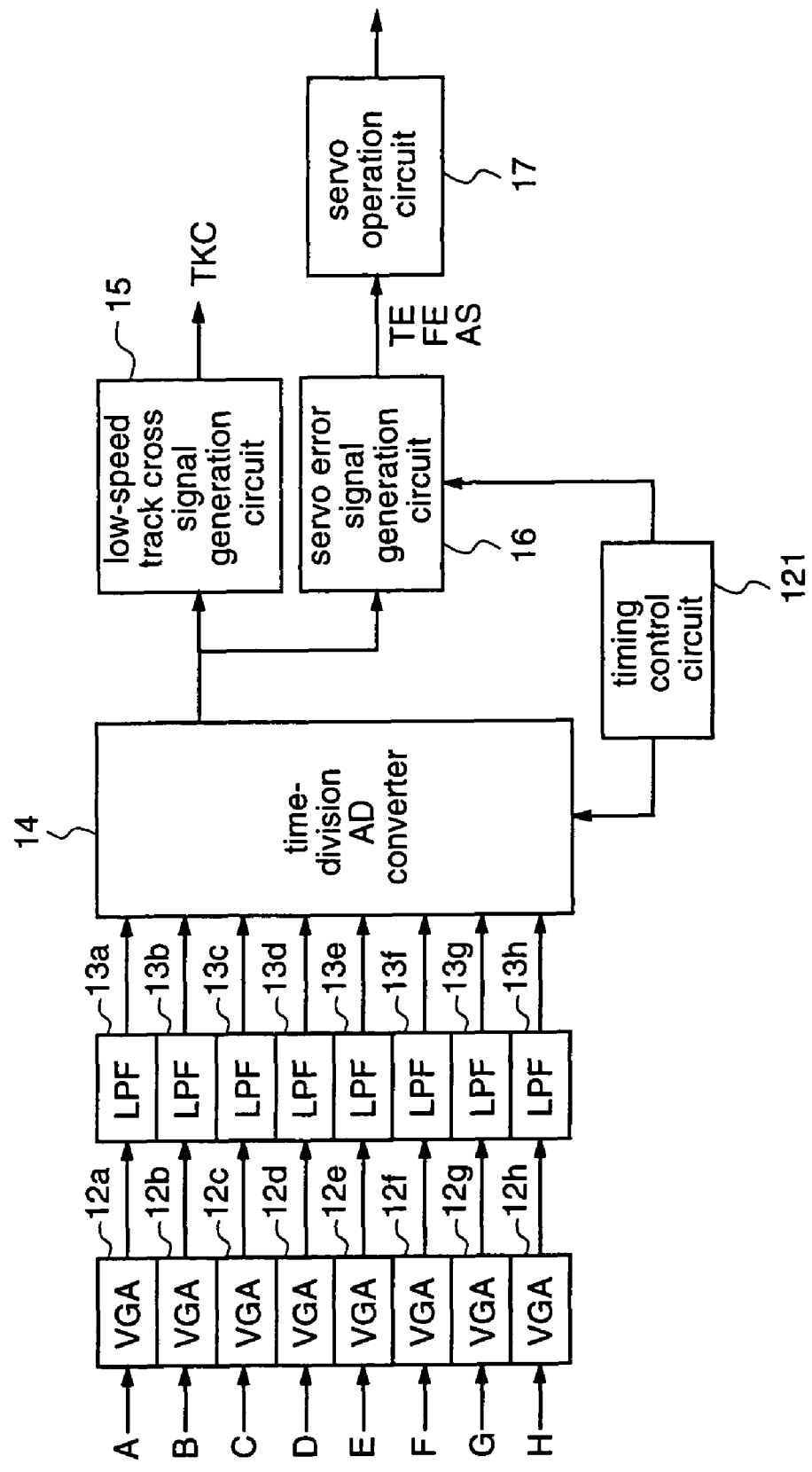
FIG. 12 is a block diagram illustrating an example of construction of a low frequency band processing circuit of an optical disc device according to a seventh embodiment of the present invention.

FIG. 12 is a block diagram for explaining the construction of the low frequency band processing circuit according to the seventh embodiment of the present invention.

In FIG. 12, the low frequency band processing circuit comprises VGA 12a~h, LPF 13a~h, a time-division AD converter 14, a low-speed track cross signal generation circuit 15, a servo error signal generation circuit 16, a servo operation circuit 17, and a timing control circuit 121. In the low frequency band processing circuit according to the seventh embodiment, the same components as those of the low frequency band processing circuit according to the first embodiment described using FIG. 2 are assigned the same reference numerals, and therefore, repeated description is not necessary.

The timing control circuit 121 controls the operation timings of the time-division AD converter 14 and the servo error signal generation circuit 16 and, more particularly, it controls the operation timings of the time-division AD converter 14 and the servo error signal generation circuit 16 in accordance with the contents of arithmetic processing to be performed by the servo error signal generation circuit 16 according to the structure of the optical pickup, the recording/playback media, and the recording/playback mode.

Hereinafter, the operation timing control by the timing control circuit 121 will be described taking examples. In the examples described hereinafter, it is assumed that there are plural patterns of signals outputted from the pickup and plural patterns of servo error signals to be generated.

Example 1

Initially, as a first example, it is assumed that the signals outputted from the photodetectors A~H of the optical pickup are AD converted by the time-division AD converter 14, and the signals from the photodetectors A~H which are digitized by the servo error signal generation circuit 16 are successively output as signals from channels 1 to 8. At this time, the servo error signal generation circuit 16 generates one servo error signal using the signals from the channels 1 to 4 and, thereafter, generates another servo error signal using the signals from the channels 5 and 6.

Figure 13:
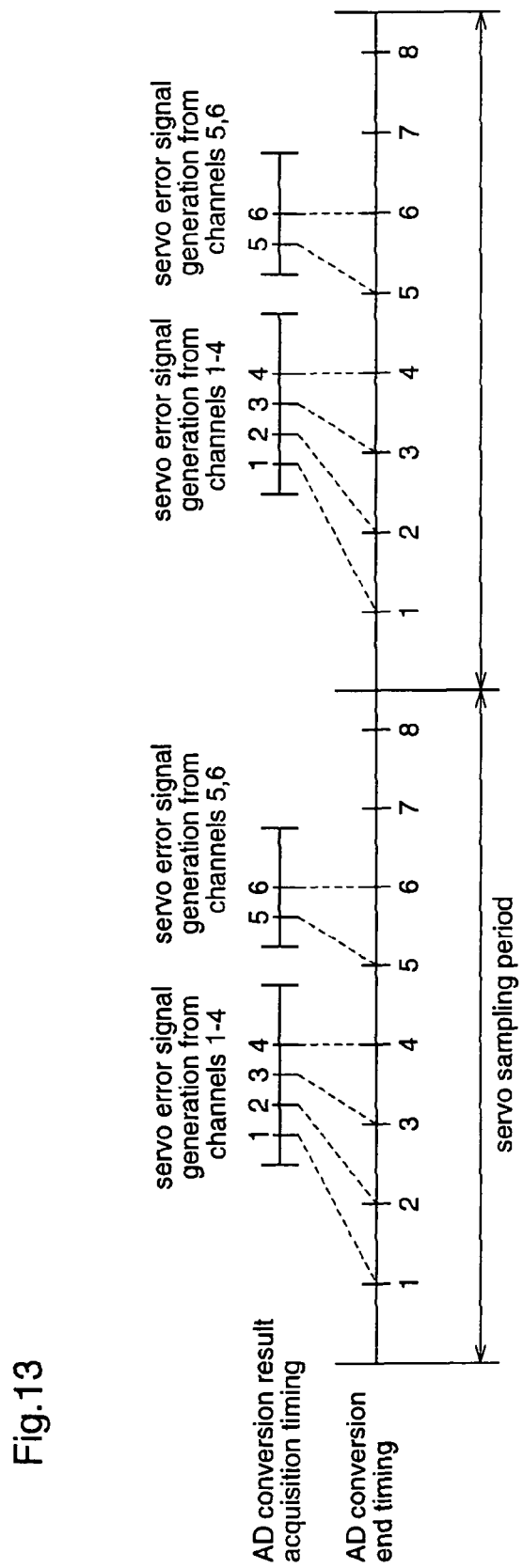
FIG. 13 is a timing chart illustrating the operation timings of the time-division AD converter and the servo error signal generation circuit according to a first example.

FIG. 13 is a timing chart illustrating examples of operation timings of the time-division AD converter 14 and the servo error signal generation circuit 16. In FIG. 13, numerals indicate the above-mentioned channel numbers.

As shown in FIG. 13, the timing control circuit 121 controls the operation timings of the time-division AD converter 14 and the servo error signal generation circuit 16, and makes the timing at which the AD conversion result of the channel 4 is obtained by the servo error signal generation circuit 16, coincide with the timing at which AD conversion of the channel 4 by the time-division AD converter 14 is completed, during the operation of generating servo error signals from the channels 1, 2, 3, and 4. Further, the timing control circuit 121 makes the timing at which the AD conversion result of the channel 6 is obtained by the servo error signal generation circuit 16, coincide with the timing at which AD conversion of the channel 6 by the time-division AD converter 14 is completed, during the operation of generating servo error signals from the channels 5 and 6.

As described above, the timing control circuit 121 makes the signal acquisition completion timing of the signals of all the received light amounts that are required for generating one servo error signal by the servo error signal generation circuit 16, coincide with the AD conversion end timing of the corresponding signals by the time-division AD converter 14, whereby a phase delay during the servo error signal generation can be reduced.

Example 2

Next, as a second example, it is assumed that the signals from the photodetectors A~H of the optical pickup are AD converted by the time-division AD converter 14, and the signals A~D from the photodetectors receiving the main beam are successively output to the servo error signal generation circuit 16 as signals from the channels 1 to 4 while the signals E~H from the photodetectors receiving the sub beam are successively output to the servo error signal generation circuit 16 as signals from the channels 5 to 8. At this time, it is assumed that the servo error signal generation circuit 16 generates servo error signals using the successively inputted signals from the channels 1 to 6.

Figure 14:
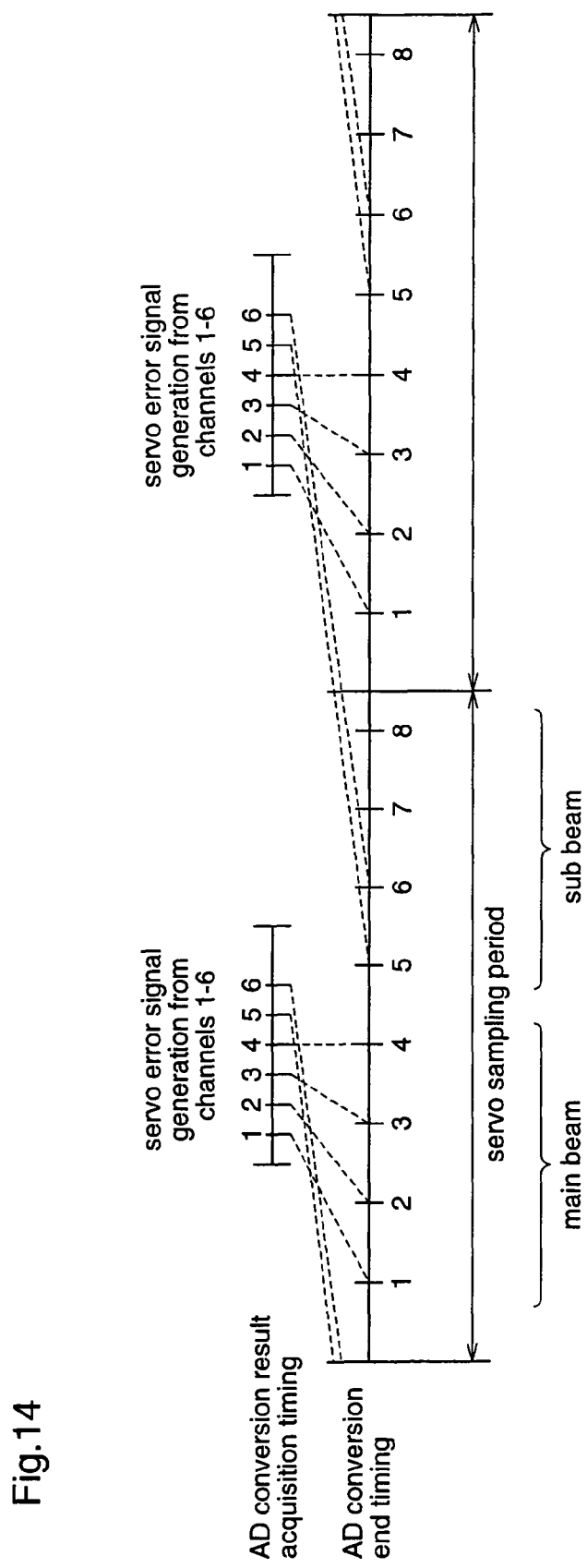
FIG. 14 is a timing chart illustrating the operation timings of the time-division AD converter and the servo error signal generation circuit according to a second example.

FIG. 14 is a timing chart illustrating examples of operation timings of the time-division AD converter 14 and the servo error signal generation circuit 16. In FIG. 14, numerals indicate the above-mentioned channel numbers.

As shown in FIG. 14, the timing control circuit 121 controls the operation timings of the time-division AD converter 14 and the servo error signal generation circuit 16, and makes the AD conversion result acquisition timing of the channel 4 by the servo error signal generation circuit 16 coincide with the AD conversion end timing of the channel 4 by the time-division AD converter 14, during the operation of generating servo error signals from the channels 1, 2, 3, 4, 5, and 6. Further, the servo error signal generation circuit 16 uses the one-sampling-period previous AD conversion results as the AD conversion results from the channels 5 and 6 which are information of received light amounts corresponding to the sub beam. The reason is as follows. When the signals from the channels 1 to 6 which are successively output from the time-division AD converter 14 are obtained to generate a servo error signal, a phase delay that occurs in the servo error signal due to phase delays in the signals corresponding to the main beam is more likely to affect the control precision of the whole device than an error that occurs during generation of the servo error signal due to the use of the one-sampling-period previous data as information of the received light amount corresponding to the sub beam.

As described above, since the servo error signal generation circuit 16 uses the one-sampling-period previous AD conversion result as a signal indicating the information of the received light amount corresponding to the sub beam, it can perform servo error signal generation immediately after acquisition of the AD conversion result corresponding to the main beam. Further, since the timing control circuit 121 makes the timing at which acquisition of the signal of the received light amount corresponding to the main beam that is necessary for generating a servo error signal is completed, coincide with the timing at which AD conversion of the corresponding signal by the time-division AD converter 14 is ended, it is possible to reduce phase delays in the signals corresponding to the main beam, and reduce influence due to a phase delay in the generated servo error signal.

Example 3

Next, as a third example, it is assumed that the signals from the photodetectors A~D of the optical pickup are AD-converted by the time-division AD converter 14, and the digitized signals from the photodetectors A~D are successively output to the servo error signal generation circuit 16 as signals from channels 1 to 4. At this time, it is assumed that the servo error signal generation circuit 16 generates two kinds of servo error signals using the same signals outputted from the channels 1 to 4.

Figure 15:
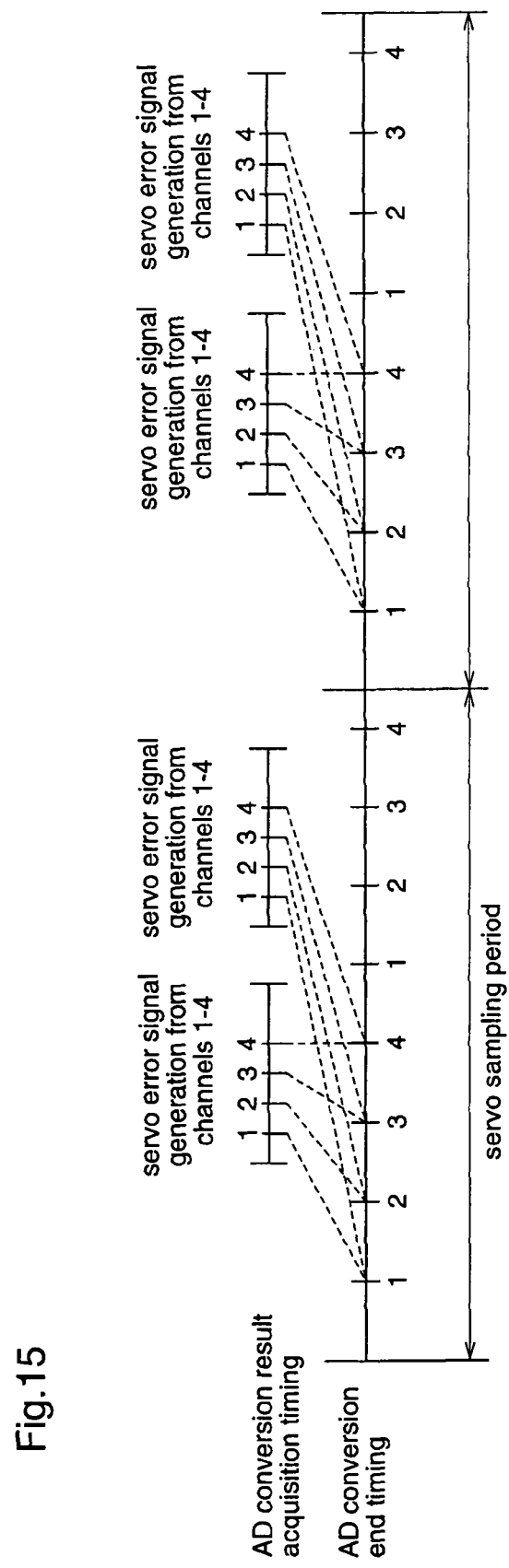
FIG. 15 is a timing chart illustrating the operation timings of the time-division AD converter and the servo error signal generation circuit according to a third example.

FIG. 15 is a timing chart illustrating examples of operation timings of the time-division AD converter 14 and the servo error signal generation circuit 16. In FIG. 15, numerals indicate the channel numbers.

As shown in FIG. 15, the timing control circuit 121 controls the operation timings of the time-division AD converter 14 and the servo error signal generation circuit 16, and makes the AD conversion result acquisition timing of the channel 4 by the servo error signal generation circuit 16 coincide with the AD conversion end timing of the channel 4 by the time-division AD converter 14, during the operation of generating the initial servo error signal using the signals from the channels 1, 2, 3, and 4.

Further, during the operation of generating two kinds of servo error signals, the servo error signal generation circuit 16 performs a generation operation for one of the servo error signals which is more likely to be affected by a phase delay than the other servo error signal, and thereafter, performs generation of the other servo error signal using information of the signals from the channels 1, 2, 3, and 4 that have been used for generating the first servo error signal. For example, when generating two kinds of servo error signals such as a TE signal and an FE signal, if the TE signal is more likely to be affected by a phase delay than the FE signal, the servo error signal generation circuit 16 firstly generates a TE signal that is more likely to be affected by a phase delay, and then generates an FE signal using the same output signal from the time-division AD converter 14. The order of tracking error signals that are more likely to be affected by a phase delay depends on the structure of the optical pickup, the recording/playback media, the recording/playback mode and the like. However, generally, the servo error signals are more likely to be affected by a phase delay in the order of a TE signal, an FE signal, and an AS signal.

As described above, the servo error signal generation circuit 16 generates, with higher priority, a servo error signal that is more likely to be affected by a phase delay, among plural servo error signals to be generated, and further, the timing control circuit 121 makes the timing at which acquisition of the signal indicating the received light amount that is required for generating the first servo error signal is completed, coincide with the timing at which AD conversion of the corresponding signal by the time-division AD converter 14 is ended, whereby the period from the timing at which AD conversion of the servo error signal that is more likely to be affected by a phase delay is ended to the timing at which a servo error signal is generated by the servo error signal generation circuit 16 can be reduced, resulting in a reduction in influence on the optical disc device, of a phase delay in the servo error signal.

Example 4

Next, as a fourth example, it is assumed that the signals from the photodetectors A~D of the optical pickup are AD-converted by the time-division AD converter 14, and the digitized signals from the photodetectors A~D are successively output to the servo error signal generation circuit 16 as signals from channels 1 to 4. At this time, it is assumed that the servo error signal generation circuit 16 generates two kinds of servo error signals using signals that are output from the channels 1 to 4 within one sampling period.

Figure 16:
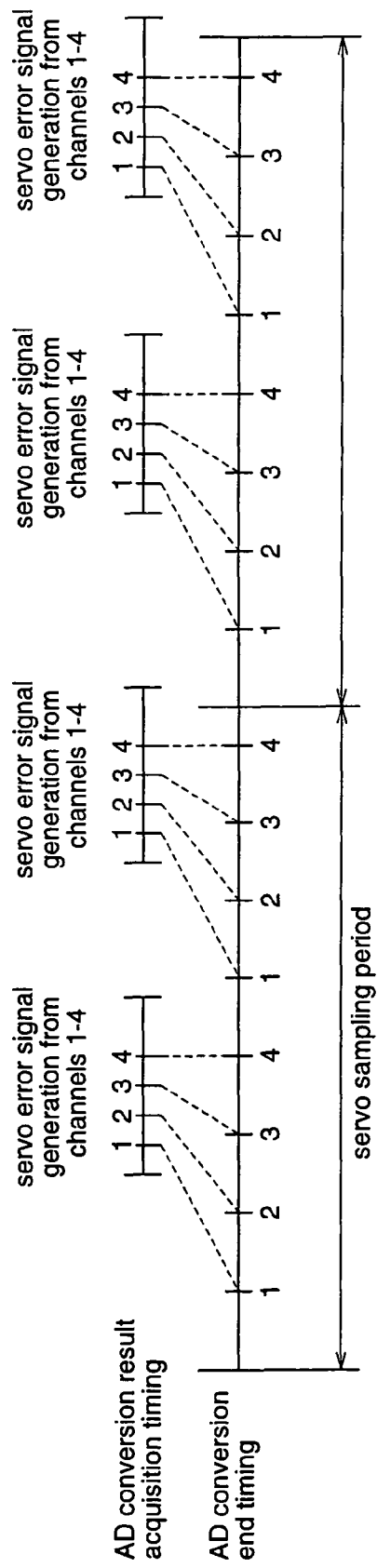
FIG. 16 is a timing chart illustrating the operation timings of the time-division AD converter and the servo error signal generation circuit according to a fourth example.

FIG. 16 is a timing chart illustrating examples of operation timings of the time-division AD converter 14 and the servo error signal generation circuit 16. In FIG. 16, numerals indicate the channel numbers.

As shown in FIG. 16, the timing control circuit 121 controls the operation timings of the time-division AD converter 14 and the servo error signal generation circuit 16, and AD-converts the signals from the channels 1, 2, 3, and 4 repeatedly within one sampling period, and further, makes the AD conversion result acquisition timing of the channel 4 by the servo error signal generation circuit 16 coincides with the AD conversion end timing of the channel 4 by the time-division AD converter 14, in each of generation operations of two kinds of servo error signals using the signals from the channels 1, 2, 3, and 4.

In this way, when generating plural servo error signals from the AD conversion results of the same channel within one sampling period, the time-division AD converter 14 AD-converts the same channel repeatedly within one sampling period, and the timing control circuit 121 makes the timing at which acquisition of the signals of all the received light amounts to be used for generation of a servo error signal is completed, coincide with the timing at which AD conversion of the corresponding signal by the time-division AD converter 14 is ended, thereby reducing a phase delay in the servo error signal.

As described above, since the optical disc device according to the seventh embodiment of the present invention is provided with the timing control circuit for controlling the operation timings of the time-division AD converter and the servo error signal generation circuit, even when generating plural servo error signals time-divisionally using an operation unit, it is possible to reduce a phase delay that may occur during generation of servo error signals.

Embodiment 8

Next, another example of the low frequency band processing circuit described for the first embodiment will be described as an eighth embodiment of the present invention. The low frequency band processing circuit of the optical disc device described hereinafter can reduce a phase delay that may occur during generation of servo error signals, by controlling the type of output data from the time-division AD converter 14 and the output timing, even when the processing ability of the servo error signal generation circuit 16 is low.

Figure 17:
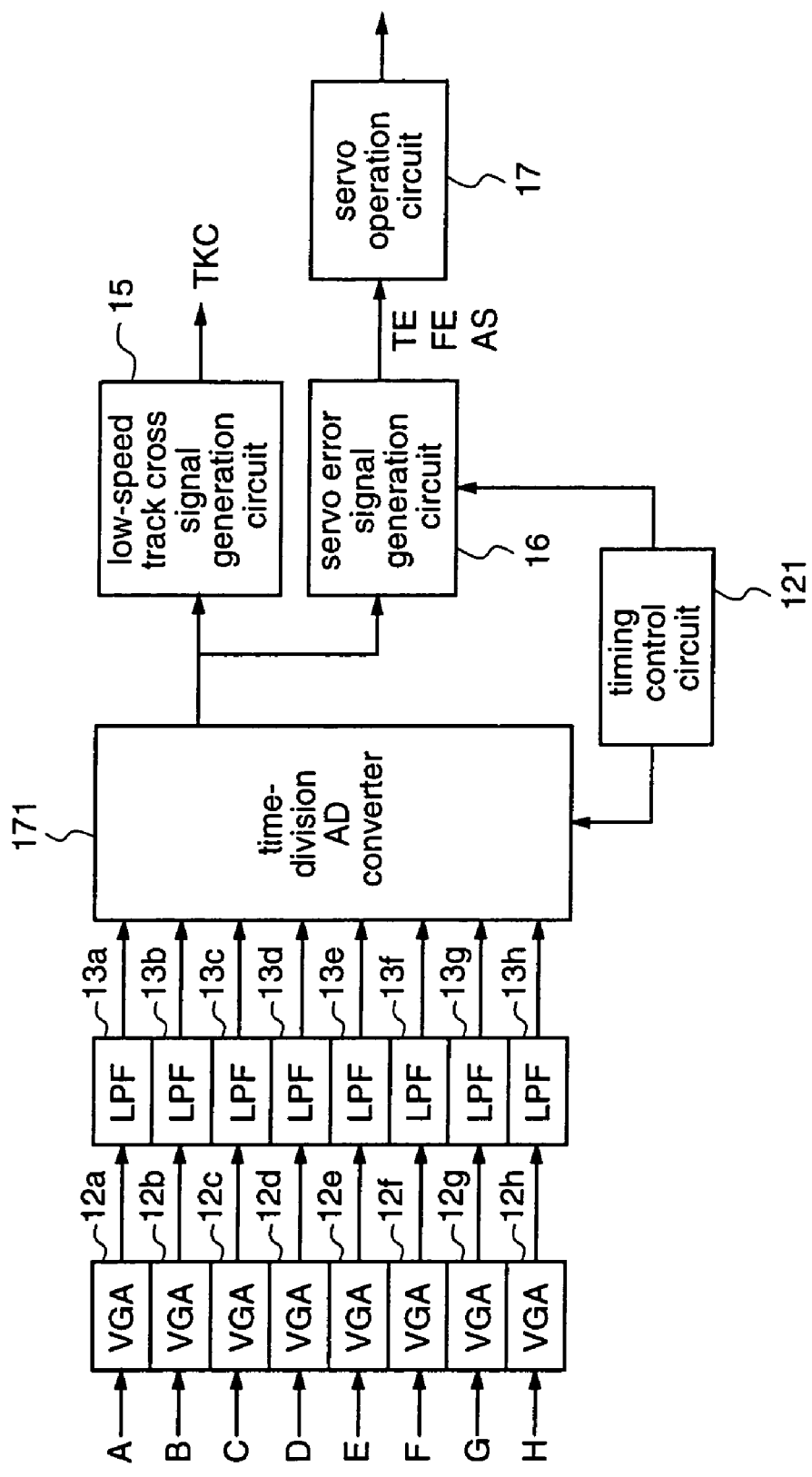
FIG. 17 is a block diagram illustrating an example of construction of a low frequency band processing circuit of an optical disc device according to an eighth embodiment of the present invention.

FIG. 17 is a block diagram for explaining the construction of the low frequency band processing circuit according to the eighth embodiment of the present invention.

In FIG. 17, the low frequency band processing circuit comprises VGAs 12, LPFs 13, a time-division AD converter 171, a low-speed track cross signal generation circuit 15, a servo error signal generation circuit 16, a servo operation circuit 17, and a timing control circuit 121. In the low frequency band processing circuit according to the eighth embodiment of the invention, the same components as those of the low frequency band processing circuit described for the first embodiment using FIG. 2 are given the same reference numerals and, therefore, repeated description is not necessary.

The time-division AD converter 171 receives plural analog signals indicating the amounts of light received by the plural photodetectors of the optical pickup, and AD-converts the inputted analog signals time-divisionally while arbitrarily controlling selection of channels for performing AD conversion of the inputted analog signals as well as the channel switching timing, and then outputs the digitized information of light amounts to the servo error signal generation circuit 16.

The timing control circuit 121 controls the operation timings of the time-division AD converter 171 and the servo error signal generation circuit 16, that is, it controls the operation timings of the time-division AD converter 171 and the servo error signal generation circuit 16 in accordance with the contents of arithmetic processing to be performed by the servo error signal generation circuit 16, which are adapted to the structure of the optical pickup, the recording/playback media, and the recording/playback mode.

Next, the construction of the time-division AD converter 171 will be described in more detail.

Figure 18:
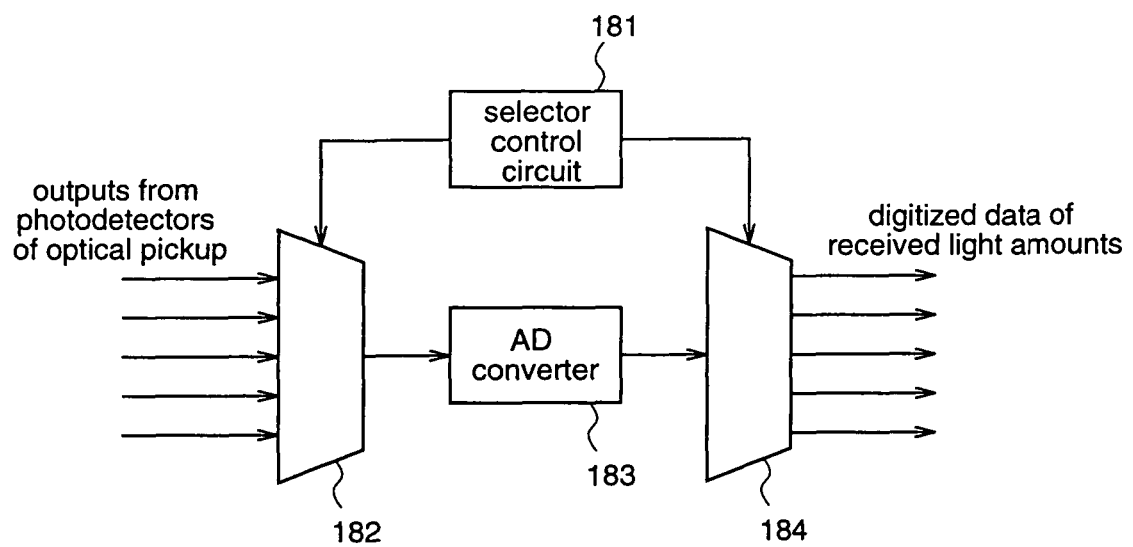
FIG. 18 is a block diagram illustrating an example of construction of a time-division AD converter of the optical disc device according to the eighth embodiment of the present invention.

FIG. 18 is a block diagram illustrating an example of construction of the time-division AD converter 171.

In FIG. 18, the time-division AD converter 171 comprises a selector control circuit 181, an input selector 182, an AD converter 183, and an output selector 184.

The selector control circuit 181 outputs control signals to the input selector 182 and the output selector 184 to control selection of a channel in which the inputted analog signal is to be AD-converted as well as the channel switching timing.

The input selector 182 receives the analog signals which are output from the respective photodetectors A~H of the optical pickup, and selects a signal of a predetermined channel at a predetermined timing that is indicated by the selector control circuit 181 to output the selected signal to the AD converter 183.

The AD converter 183 AD-converts the analog signal outputted from the input selector 182, and outputs the digitized signal to the output selector 184.

The output selector 184 outputs the digitized signal outputted from the AD converter 183 through the channel selected by the input selector 182, which is indicated by the selector control circuit 181.

Next, the operation timing control by the time-division AD converter 171 and the timing control circuit 121 will be described taking an example.

Figure 19:
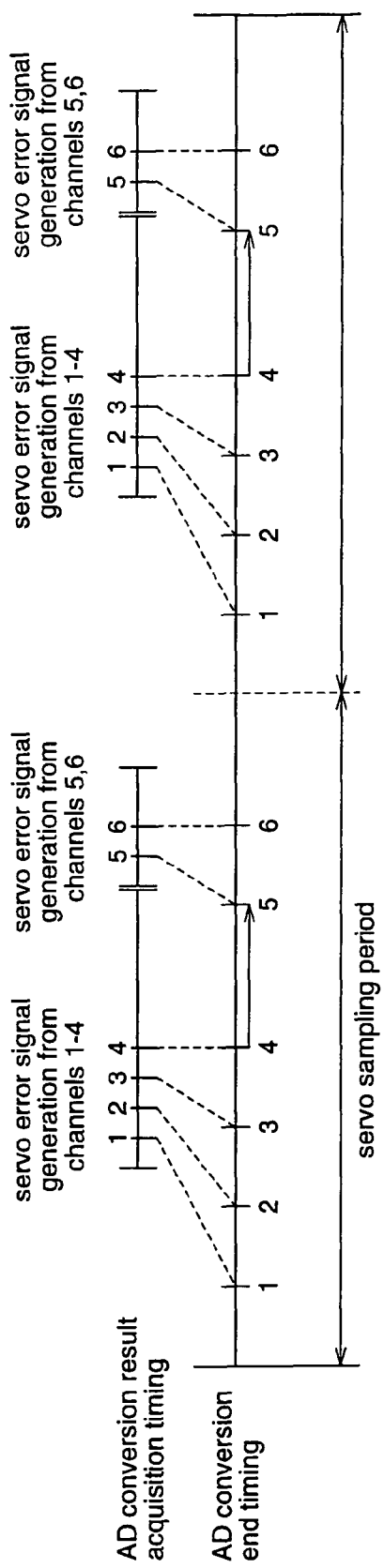
FIG. 19 is a timing chart illustrating examples of operation timings of the time-division AD converter and the servo error signal generation circuit of the optical disc device according to the eighth embodiment of the present invention.
Figure 20:
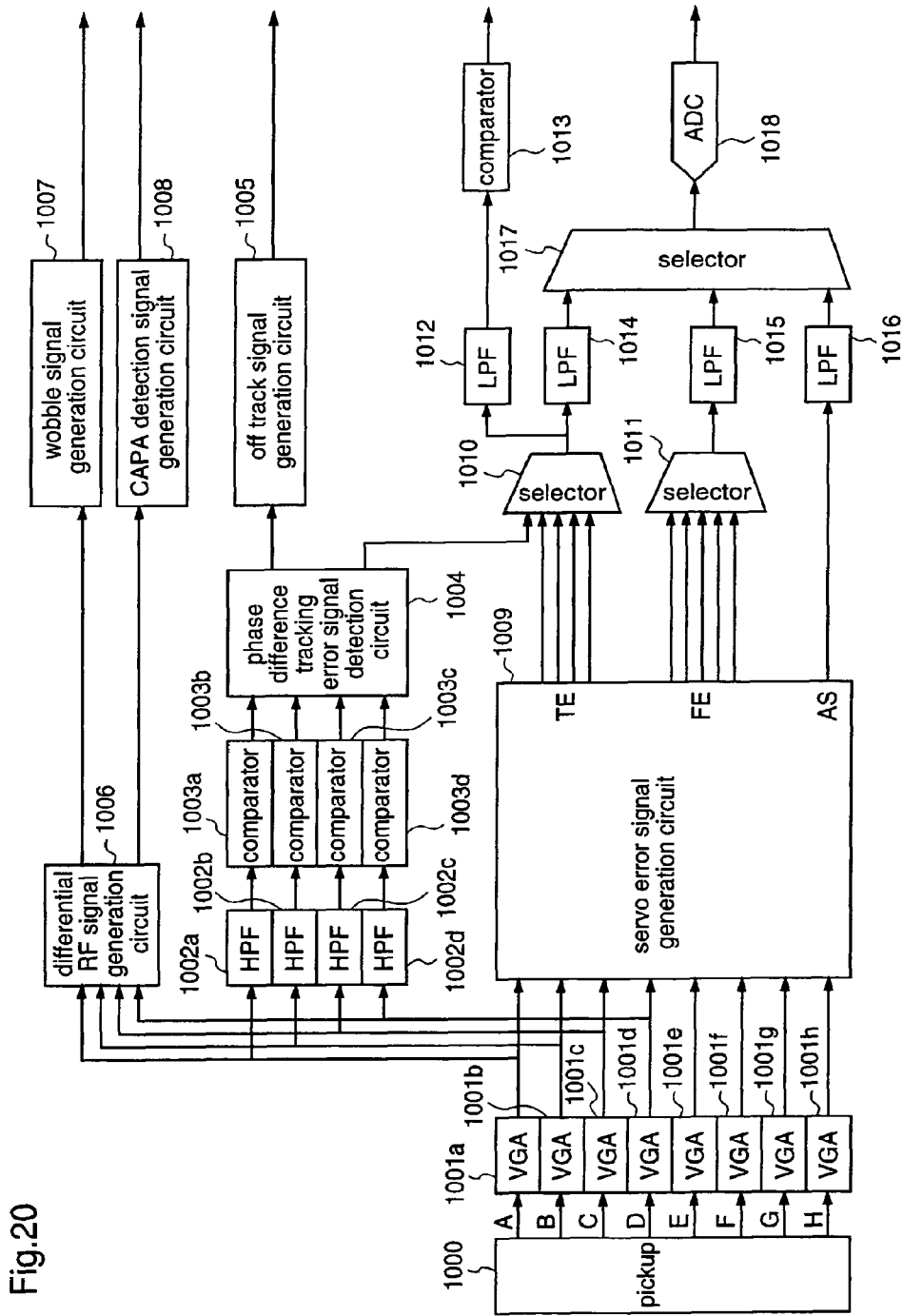
FIG. 20 is a block diagram illustrating the construction of the conventional optical disc device.

FIG. 19 is a timing chart illustrating examples of operation timings of the time-division AD converter 171 and the servo error signal generation circuit 16. In FIG. 19, numerals indicate channel numbers.

In FIG. 19, in order to simplify description of the operations of the time-division AD converter 171, the servo error signal generation circuit 16, and the timing control circuit 121, it is assumed that the signals from the photodetectors A~H of the optical pickup are AD-converted by the time-division AD converter 14, and the digitized signals from the photodetectors A~H are successively output to the servo error signal generation circuit 16 as signals of channels 1 to 8. Further, it is assumed that the servo error signal generation circuit 16 generates one servo error signal using the signals from the channels 1 to 4, and thereafter, generates another servo error signal using the signals from the channels 5 and 6.

In the case where the processing ability of the servo error signal generation circuit 16 is low and thereby it takes much time to perform generation of a servo error signal using the channels 1 to 4, if the time-division AD converter 171 performs AD conversion of the channels 5 and 6 at the same timing as the channels 1 to 4, there may occurs a situation that AD conversion of the channel 6 by the time-division AD converter 171 is ended during generation of a servo error signal using the channels 1 to 4 by the servo error signal generation circuit 16. Thereby, the timing control circuit 121 cannot make the AD conversion result acquisition timing of the channel 6 by the servo error signal generation circuit coincide with the AD conversion end timing of the channel 6 of the time-division AD converter 171, during generation of a servo error signal from the channels 5 and 6.

So, as shown in FIG. 19, the time-division AD converter 171 according to the eighth embodiment of the invention delays the AD conversion timings of the channels 5 and 6 on the basis of the operation time of the operation for generating a servo error signal using the channels 1 to 4 by the servo error signal generation circuit 16, and the timing control circuit 121 makes the AD conversion result acquisition timing of the channel 6 by the servo error signal generation circuit 16 coincide with the AD conversion end timing of the channel 6 by the time-division AD converter 171. At this time, the operation time required for the servo error signal generation by the servo error signal generation circuit 16 is previously set on the time-division AD converter 171, and the AD conversion timings of the channels 5 and 6 are delayed while controlling the input selector 182 and the output selector 184 by the selector control circuit 181.

As described above, in the optical disc device according to the eighth embodiment of the invention, the type of output data to be AD-converted by the time-division AD converter as well as the output timing are controlled, and the timing control circuit 121 makes the signal acquisition completion timing of the signals of all the received light amounts that are required for generating one servo error signal by the servo error signal generation circuit 16, coincide with the AD conversion end timing of the corresponding signal by the time-division AD converter 171. Therefore, even when the processing ability of the servo error signal generation circuit 16 is low, a phase delay that occurs during servo error signal generation can be reduced.

In the low frequency band processing circuit of the optical disc device according to any of the first to eighth embodiments, high frequency components are removed using LPFs and thereafter various kinds of signals required for recording/ playback of the optical disc are generated. However, the low frequency band processing circuit may dispense with the LPFs to process the signals including high frequency band components.

The present invention relates to an optical disc device that can accurately detect various kinds of signals required for playing an optical disc from signals outputted from photodetectors of an optical pickup, and is valuable because it can realize reductions in device size, power consumption, and cost at the same time.

The invention claimed is:

1. An optical disc device comprising:
a high frequency band processing circuit for removing low frequency components of signals outputted from photodetectors of an optical pickup, and subjecting frequency bands of the signals up to an RF signal frequency to AD conversion using a high-speed low-bit AD converter, and then generating various kinds of signals required for recording/playback of an optical disc by digital processing; and
a low frequency band processing circuit for removing high frequency components of the signals outputted from the photodetectors of the optical pickup, and subjecting the signals to AD conversion with a low-speed high-bit AD converter, and then generating various kinds of signals required for recording/playback of the optical disc by digital processing,
wherein
the high frequency band processing circuit includes plural stages of HPFs having different cutoff frequencies which are in ascending order with respect to the signals outputted from the photodetectors of the pickup, and performs detection of plural signals required for recording/playback of the optical disc using signals of desired frequency bands which are outputted from the respective HPFs.

2. An optical disc device comprising:
a high frequency band processing circuit for removing low frequency components of signals outputted from photodetectors of an optical pickup, and subjecting frequency bands of the signals up to an RF signal frequency to AD conversion using a high-speed low-hit AD converter, and then generating various kinds of signals required for recording/playback of an optical disc by digital processing; and
a low frequency band processing circuit for removing high frequency components of the signals outputted from the photodetectors of the optical pickup, and subjecting the signals to AD conversion with a low-speed high-bit AD converter, and then generating various kinds of signals required for recording/playback of the optical disc by digital processing,
wherein
the high frequency band processing circuit comprises:
first HPFs for removing DC components of the output signals from the respective photodetectors of the pickup and level fluctuations in low frequencies, the first HPFs being provided correspondingly to the output signals from the respective photodetectors;
second HPFs for receiving the output signals from the first HPFs, and removing frequencies which are higher than the cutoff frequency of the first HPFs and equal to and lower than a predetermined cutoff frequency;
AD converters for receiving the output signals from the second HPFs, and AD-converting the output signals from the second HPFs; and
third HPFs for receiving the digital signals outputted from the AD converters, and removing frequencies which are higher than the cutoff frequency of the second HPFs and equal to and lower than a predetermined cutoff frequency.

3. An optical disc device comprising:
a high frequency band processing circuit for removing low frequency components of signals outputted from photodetectors of an optical pickup, and subjecting frequency bands of the signals tip to an RF signal frequency to AD conversion using a high-speed low-bit AD converter, and then generating various kinds of signals required for recording/playback of an optical disc by digital processing; and
a low frequency band processing circuit for removing high frequency components of the signals outputted from the photodetectors of the optical pickup, and subjecting the signals to AD conversion with a low-speed high-bit AD converter, and then generating various kinds of signals required for recording/playback of the optical disc by digital processing,
wherein
the high frequency band processing circuit comprises:
second HPFs for removing frequencies which are equal to and lower than a predetermined cutoff frequency of the output signals from the respective photodetectors of the pickup, the second HPFs being provided correspondingly to the output signals from the respective photodetectors;
AD converters for receiving the output signals from the second HPFs, and AD-converting the output signals from the second HPFs; and
third HPFs for receiving the digital signals outputted from the AD converters, and removing frequencies which are higher than the cutoff frequency of the second HPFs and equal to and lower than a predetermined cutoff frequency.

4. An optical disc device comprising:
first HPFs for removing DC components of output signals from photodetectors of a pickup and level fluctuations in low frequencies, the first HPFs being provided correspondingly to the output signals from the respective photodetectors;
second HPFs for receiving the output signals from the first HPFs, and removing frequencies which are higher than the cutoff frequency of the first HPFs and equal to and lower than a predetermined cutoff frequency;
AD converters for receiving the output signals from the second HPFs, and AD-converting the output signals from the second HPFs; and
third HPFs for receiving the digital signals outputted from the AD converters, and removing frequencies which are higher than the cutoff frequency of the second HPFs and equal to and lower than a predetermined cutoff frequency.

5. An optical disc device comprising:
second HPFs for removing frequencies which are equal to and lower than a predetermined cutoff frequency of output signals from photodetectors of a pickup, the second HPFs being provided correspondingly to the output signals from the respective photodetectors;
AD converters for receiving the output signals from the second HPFs, and AD-converting the output signals from the second HPFs; and
third HPFs for receiving the digital signals outputted from the AD converters, and removing frequencies which are higher than the cutoff frequency of the second HPFs and equal to and lower than a predetermined cutoff frequency.

6. An optical disc device as defined in any of claims 2 and 4 wherein
the cutoff frequency of the first HPFs is a frequency that does not adversely affect jitter of the signals outputted from the respective photodetectors of the pickup.

7. An optical disc device as defined in any of claims 2, 3, 4, and 5 further comprising a wobble signal generation circuit for generating a wobble signal using the digital signals outputted from the AD converters.

8. An optical disc device as defined in claim 7 wherein the wobble signal generation circuit comprises:
a logic operation circuit for performing an arithmetic operation using the digital signals outputted from the AD converters to calculate a pushpull tracking error signal; and
a digital BPF for generating a wobble signal from the pushpull tracking error signal calculated by the logic operation circuit.

9. An optical disc device as defined in claim 8 wherein the cutoff frequency of the second HPFs is a frequency equal to or lower than a passband frequency of the digital BPF.

10. An optical disc device as defined in any of claims 2, 3, 4, and 5 further comprising:
a pushpull track cross signal generation circuit for generating a pushpull track cross signal using the digital signals outputted from the AD converters;
wherein the pushpull track cross signal generated by the pushpull track cross signal generation circuit is used as a track cross signal during high-speed seeking of an optical disc.

11. An optical disc device as defined in claim 10 wherein the pushpull track cross signal generation circuit comprises:
a logic operation circuit for performing an arithmetic operation using the digital signals outputted from the AD converters to calculate a pushpull tracking error signal; and
a binarization circuit for binarizing the pushpull tracking error signal calculated by the logic operation circuit at a zerocross point to generate a pushpull track cross signal.

12. An optical disc device as defined in any of claims 2, 3, 4, and 5 wherein
the cutoff frequency of the third HPFs is a frequency that enables removal of voltage level fluctuations, and removal of wobble components.

13. An optical disc device as defined in any of claims 2, 3, 4, and 5 further comprising a phase difference tracking error signal detection circuit for generating a phase difference tracking error signal by digital processing using the digital signals outputted from the third HPFs.

14. An optical disc device comprising:
a high frequency band processing circuit for removing low frequency components of signals outputted from photodetectors of an optical pickup, and subjecting frequency bands of the signals up to an RF signal frequency to AD conversion using a high-speed low-bit AD converter, and then generating various kinds of signals required for recording/playback of an optical disc by digital processing; and
a low frequency band processing circuit for removing high frequency components of the signals outputted from the photodetectors of the optical pickup, and subjecting the signals to AD conversion with a low-speed high-bit AD converter, and then generating various kinds of signals required for recording/playback of the optical disc by digital processing,
wherein the low frequency band processing circuit comprises:
LPFs having a cutoff frequency equal to or lower than ½ of a sampling frequency, the LPFs being provided correspondingly to signals outputted from photodetectors of a pickup;
a time-division AD converter for performing AD conversion of plural channels while successively selecting the output signals from the first LPFs;
a servo error signal generation circuit for performing a servo error signal generation operation by digital processing using the output from the time-division AD converter to generate a servo error signal; and
a servo operation circuit for performing a digital servo operation on the basis of the servo error signal generated by the servo error signal generation circuit to generate a driving signal for a driving system.

15. An optical disc device comprising:
LPFs having a cutoff frequency equal to or lower than ½ of a sampling frequency, the LPFs being provided correspondingly to signals outputted from photodetectors of a pickup;
a time-division AD converter for performing AD conversion of plural channels while successively selecting the output signals from the first LPFs;
a servo error signal generation circuit for performing a servo error signal generation operation by digital processing using the output from the time-division AD converter to generate a servo error signal; and
a servo operation circuit for performing a digital servo operation on the basis of the servo error signal generated by the servo error signal generation circuit to generate a driving signal for a driving system;
wherein, when the servo error signal generation circuit performs the servo error signal generation operation using the signals from the photodetectors of the optical pickup receiving a main beam and signals from the photodetectors of the optical pickup receiving a sub beam,
the servo error signal generation circuit controls the operation timing of arithmetic processing for the signals from the photodetectors receiving the main beam, which are outputted from the time-division AD converter, and the operation timing of arithmetic processing for the signals from the photodetectors receiving the sub beam, which are outputted from the time-division AD converter, separately from each other, and
the servo operation circuit performs the digital servo operation using the signals generated by the servo error signal generation circuit to generate a driving signal for a driving system.

* * * * *